(12) United States Patent
Bill

(10) Patent No.: US 11,623,621 B2
(45) Date of Patent: Apr. 11, 2023

(54) BRAKE CHARACTERISTICS

(71) Applicant: Airbus Operations Limited, Bristol (GB)

(72) Inventor: Andrew Bill, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 309 days.

(21) Appl. No.: 16/860,484

(22) Filed: Apr. 28, 2020

(65) Prior Publication Data

US 2020/0339083 A1    Oct. 29, 2020

(30) Foreign Application Priority Data

Apr. 29, 2019 (GB) ..................................... 1905993

(51) Int. Cl.
*B60T 8/17* (2006.01)
*B60T 17/22* (2006.01)

(52) U.S. Cl.
CPC ............ *B60T 8/1703* (2013.01); *B60T 17/22* (2013.01); *B60T 2270/413* (2013.01)

(58) Field of Classification Search
CPC .. B60T 8/1703; B60T 17/22; B60T 2270/413; B60T 17/221; B60T 13/662; B60T 8/325; B64F 5/60; B64C 25/42; F16D 66/00; F16D 66/022; F16D 2066/001
See application file for complete search history.

(56) References Cited

U.S. PATENT DOCUMENTS

| 5,613,578 A | 3/1997 | Moseley et al. |
| 5,845,975 A | 12/1998 | Wells |
| 10,202,204 B1 | 2/2019 | Daidzic |
| 2008/0154445 A1 | 6/2008 | Goodman et al. |
| 2009/0084637 A1* | 4/2009 | Bailey ................... F16D 66/021 188/1.11 E |
| 2014/0163815 A1 | 6/2014 | Cahill et al. |

(Continued)

FOREIGN PATENT DOCUMENTS

| CA | 2487704 | 5/2006 |
| EP | 2743534 | 6/2014 |
| GB | 2 411 934 | 9/2005 |

(Continued)

OTHER PUBLICATIONS

N. Daidzic, "Modeling and Computation of the Maximum Braking Energy Speed for Transport Category Airplanes", Journal of Aviation Technology and Engineering, 6:2, 2017, pp. 2-25.

(Continued)

*Primary Examiner* — Michael V Kerrigan
(74) *Attorney, Agent, or Firm* — Nixon & Vanderhye P.C.

(57) ABSTRACT

A non-transitory computer readable storage medium is disclosed having stored thereon instructions which, when executed by a processor, cause the processor to: determine whether an aircraft wheel brake is capable of performing a future rejected take-off event. The determination includes determining from a rejected take-off energy parameter and a set of brake parameters whether a predicted mass of the brake is sufficient to perform the future rejected take-off event. Further, a method for determining whether an aircraft wheel brake is capable of performing a future rejected take-off event is disclosed.

17 Claims, 13 Drawing Sheets

(56) References Cited

U.S. PATENT DOCUMENTS

2017/0305577 A1* 10/2017 Bill .................... B60T 17/22

FOREIGN PATENT DOCUMENTS

| GB | 2559329 | 8/2018 |
| GB | 2571397 | 8/2019 |
| RU | 2284274 | 9/2006 |
| WO | 2013/091057 | 6/2013 |
| WO | 2017/062590 | 4/2017 |

OTHER PUBLICATIONS

Extended European Search Report for European Application No. 20172201.4, five pages, dated Jul. 2, 2020.

* cited by examiner

BRAKE CHARACTERISTICS

CROSS RELATED APPLICATION

This application claims priority to United Kingdom (GB) Patent Application GB1905993.0, filed Apr. 29, 2019, the entire contents of which is hereby incorporated by reference.

TECHNICAL FIELD

The present invention relates to determining whether an aircraft wheel brake is capable of performing a future rejected take-off event.

BACKGROUND

The wheel brakes of an aircraft may undergo wear and oxidation. The amount of wear of the brakes may be checked and the brakes may be visually inspected to identify signs of oxidation. The brakes may be deemed to require a service or replacement if the amount of wear and/or the oxidation has reached a certain level. In such a case, the aircraft in question may not be cleared to fly.

SUMMARY

A first aspect of the present invention provides a non-transitory computer readable storage medium having stored thereon instructions which, when executed by a processor, cause the processor to: determine whether an aircraft wheel brake is capable of performing a future rejected take-off event, comprising: determining from a rejected take-off energy parameter and a set of brake parameters whether a predicted mass of the brake is sufficient to perform the future rejected take-off event.

Optionally, the instructions, when executed by a processor, cause the processor to: determine a number of predicted future use cycles after which the predicted mass is expected to be insufficient to perform the future rejected take-off event.

Optionally, the instructions, when executed by a processor, cause the processor to: determine a mass limit defining the minimum mass required to perform the future rejected take-off event.

Optionally, the instructions, when executed by a processor, cause the processor to: determine whether the predicted mass is sufficient to perform the future rejected take-off event by comparing the predicted mass to the mass limit.

Optionally, the instructions, when executed by a processor, cause the processor to: determine the mass limit using an amount of energy to be absorbed by the brake when performing the future rejected take-off event determined based on the characteristics of the brake.

Optionally, the instructions, when executed by a processor, cause the processor to: determine a number of predicted future use cycles for the predicted mass to reduce to the mass limit.

Optionally, the instructions, when executed by a processor, cause the processor to: issue a first notification, if the predicted mass is determined to be sufficient to perform the future rejected take-off event.

Optionally, the instructions, when executed by a processor, cause the processor to: repeat the determination of whether the brake is capable of performing the future rejected take-off event, if the predicted mass is determined to be insufficient to perform the future rejected take-off event.

Optionally, the determination is repeated using an updated rejected take-off energy parameter determined based on an updated aircraft weight.

Optionally, the instructions, when executed by a processor, cause the processor to: responsive to the updated aircraft weight satisfying an aircraft weight criterion, issue a second notification indicating that the brake requires a service or replacement, and cease repeating the determination.

Optionally, the instructions, when executed by a processor, cause the processor to: determine the rejected take-off energy parameter based on a set of user input parameters.

Optionally, the set of brake parameters comprises an upper temperature cut-off for the brake.

Optionally, the instructions, when executed by a processor, cause the processor to: determine a temperature limit which is the maximum temperature the brake is expected to reach upon the future rejected take-off event taking place.

Optionally, the instructions, when executed by a processor, cause the processor to: determine whether the predicted mass of the brake is sufficient to perform the future rejected take-off event by comparing the temperature limit to an upper temperature cut-off for the brake.

A second aspect of the present invention provides a method comprising: determining whether an aircraft wheel brake is capable of performing a future rejected take-off event, comprising: determining from a rejected take-off energy parameter and a set of brake parameters whether a predicted mass of the brake is sufficient to perform the future rejected take-off event.

Optionally, the method according to the second aspect comprises: determining a number of predicted future use cycles after which the predicted mass is expected to be insufficient to perform the future rejected take-off event.

A third aspect of the present invention provides an apparatus comprising a processor configured to: determining whether an aircraft wheel brake is capable of performing a future rejected take-off event, comprising: determining from a rejected take-off energy parameter and a set of brake parameters whether a predicted mass of the brake is sufficient to perform the future rejected take-off event.

BRIEF DESCRIPTION OF THE DRAWINGS

Embodiments of the invention will now be described, by way of example only, with reference to the accompanying drawings, in which.

DETAILED DESCRIPTION

Figure 1:
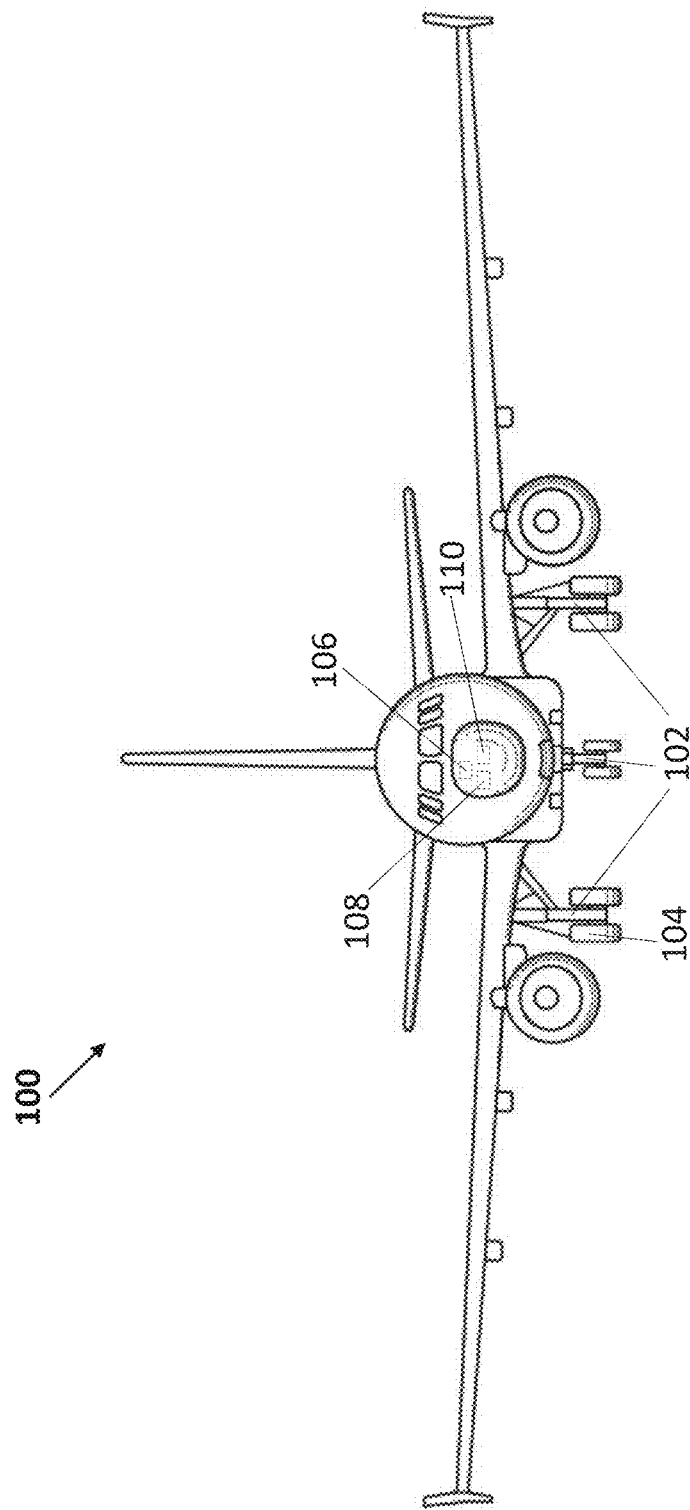
FIG. 1 is a schematic diagram of an aircraft on which examples of the invention may be deployed.

FIG. 1 is a simplified schematic view of an aircraft 100. The aircraft 100 comprises a plurality of landing gear assemblies 102. The landing gear assemblies 102 may include main and nose landing gears that may be extended during take-off and landing. Each landing gear assembly 102 includes wheels such as wheel 104. The aircraft 100 also comprises a computing system 106 comprising one or more processors and one or more computer readable storage media. The aircraft 100 also comprises a set of sensors 108 which may include sensors for measuring environmental characteristics as well as sensors associated with various components of the aircraft 100 and which measure values of various physical properties of respective components. Although the sensors 108 are represented by a single block in the schematic view of FIG. 1, it will be understood that the sensors 108 may be positioned at various different locations on the aircraft 100. The aircraft 100 may also comprises a set of indicating devices 110 for providing various indications relating to the aircraft 100 and the environmental conditions. The indicating devices may include screens which display text and/or graphics, dials, light indicators, sound indicators which emit sound to provide an indication, and the like. The indicating devices may be internal or external to the aircraft 100.

Figure 2:
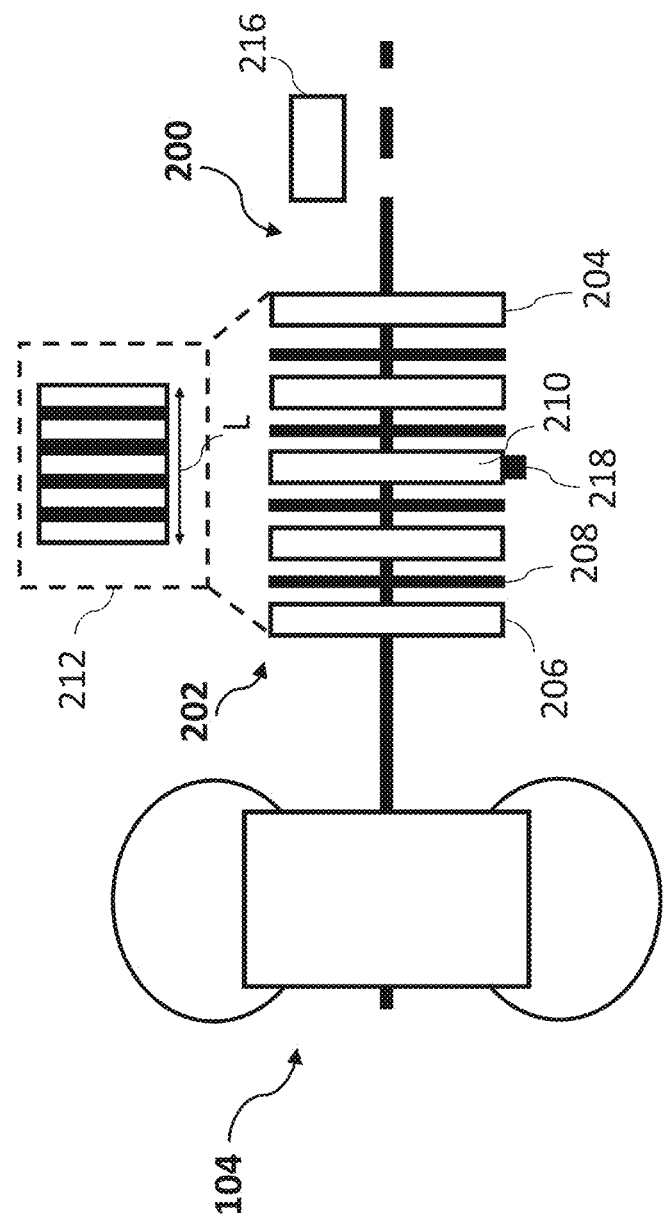
FIG. 2 is a schematic diagram of an aircraft wheel brake and a wheel of an aircraft landing gear according to an example.

FIG. 2 is a simplified schematic view of an aircraft wheel brake 200 (hereafter "brake" 200) associated with the wheel 104 of the aircraft 100. Each of the wheels of the aircraft 100 may have a brake, such as brake 200, associated with it. The brake 200 applies a braking force to inhibit the rotation of the wheel 104. In this example, the brake 200 comprises a plurality of brake discs 202 including a pressure plate 204, a reaction plate 206, and a number of rotors and stators such as the rotor 208 and the stator 210. In this example, the brake discs 202 include a plurality of rotors and stators, and the brake assembly 200 is therefore a multiple disc brake. In other examples, the brake assembly 200 may not be a multiple-disc brake. It will be understood that the type of brake used in an aircraft landing gear depends on the characteristics of the aircraft in question, such as size, carrying capacity and the like.

When the aircraft 100 travels along the ground supported by the landing gear 102, the rotors rotate with the wheel 104, whereas the stators, the pressure plate 204 and the reaction plate 206 do not rotate with the wheel 104. When braking is applied, the pressure plate 204 is urged towards the reaction plate 206 so that the brake discs 202 come into contact with one another (as shown in box 212 of FIG. 2) and friction acts to inhibit the rotational motion of the rotors, thus generating a braking force to reduce the speed of the aircraft 100. The brake 200 may be hydraulically actuated or electrically actuated.

Any one or more of the rotors, stators, pressure plate 204 and the reaction plate 206 may be composed of Carbon-Carbon (CC) composites. A brake including brake discs composed of CC composites may be referred to as a carbon brake. For example, the brake discs 202 may be composed of a graphite matrix reinforced by carbon fibers.

The brake 200 may be provided with a brake wear sensor 216 (described in further detail hereafter). The brake 200 may also be provided with a temperature sensor 218. The temperature sensor 218 may be provided in thermal contact with one of the brake discs. In the example of FIG. 2, the temperature sensor 218 is provided on the stator 210. In this example, the stator 210 is the brake disc likely to reach the highest temperatures. The temperature sensor 218 may be any type of temperature sensor suitable for use in an aircraft brake assembly. For example, the temperature sensor 218 can function properly at the temperature ranges likely to be reached by the brake discs 202. For example, the temperature sensor 218 may be a thermocouple, a surface acoustic wave (SAW) sensor, an eddy current sensor, a resistance thermal sensor, a strain gauge, or the like. If a temperature sensor is provided on a part of the brake 200 other than on one of the brake discs 202, the temperature of the brake discs 202 may be determined using an indication of the relationship between a temperature measured by said temperature sensor and the temperature of the brake discs 202. In some examples, the indication of the relationship may be determined by experiment. In some examples, the indication of the relationship may be determined using a brake thermal model.

During use, the brake discs 202 may undergo oxidation. During an oxidation reaction, oxygen reacts with the carbon of the brake discs 202 causing carbon atoms to be removed from the brake discs 202, as carbon dioxide and/or carbon monoxide is produced, leading to a loss of mass per unit volume of the disc brakes 202. The oxidation state/level of the brake 200 may be expressed as an amount of mass lost due to oxidation.

The brake discs 202 may oxidise via catalytic oxidation or thermal oxidation. Catalytic oxidation may occur when the oxidation reaction is aided by the action of a catalyst. For example, alkali metals are known catalysts for oxidation of CC composites. Catalytic oxidation may be relevant in areas where the air has relatively high salinity. Catalytic oxidation may also be relevant at airports that use runway de-icers comprising alkali salts. Thermal oxidation of the brake discs 202 may occur if the brake discs 202 reach high temperatures during use due to friction. This is because when the brake 200 is applied to reduce the speed of the aircraft 100, some of the kinetic energy of the aircraft 100 is absorbed into the brake 200 as heat causing its temperature to rise. In the present examples, the components of the brake 200 composed of CC composites (i.e. the brake discs 202) undergo oxidation. However, the present disclosure hereafter simply refers to the oxidation state of the brake 200.

Furthermore, the brake discs 202 may undergo wear due to friction during braking. For example, material from the surface of a given brake disc may be lost due to the action of friction during braking when the given brake disc comes into contact with other brake discs. Wear may cause the length L of the brake discs 202 (shown in FIG. 2) to decrease. A wear state of the brake 200 may be determined using a measured wear value. The measured wear value may be a measured length relating to the brake 200. For example, the measured wear value may be the length L of the brake discs 202 or a length from which the length L can be derived. The measured wear value provides an indication of the change in the length L, and therefore an indication of the amount of brake wear. Wear may therefore be expressed as a reduction in the length of the brake discs 202. Wear, as well as oxidation, may therefore cause a reduction in the mass of the brake 200. In the present examples, the brake discs 202 undergo wear. However, the present disclosure hereafter simply refers to the wear state of the brake 200.

Due to use, the condition of the brake discs 202 may decline with time. Pre-flight checks may be carried out to check various aspects of the aircraft 100 to ensure a safe flight. Checks may be carried out in various different ways. For example, a pilot of the aircraft 100 may obtain various indications in relation to the aircraft (using e.g. a computer system) before a flight. For example, ground crew may carry out pre-flight checks before a flight. The condition of the brakes of the aircraft 100 such as the brake 200 may be checked. In prior art examples, the brake 200 may be visually inspected to identify signs of oxidation, and an indication of the amount of brake wear may be obtained (e.g. by checking a wear pin described hereafter). Oxidation and brake wear are discussed in further detail hereafter.

If the condition of the brake 200 is found to have declined beyond a certain level (e.g. a given amount of brake wear is indicated, and or oxidation is visually apparent), the brake 200 may be deemed to require a service, or a replacement of the whole or a part of the brake 200. Consequently, the aircraft 100 may not be permitted to embark on a flight until the service or replacement has been carried out.

A brake wear threshold may be specified for the brake 200. For example, the brake wear threshold may be specified by the manufacturer of the brake 200. The brake wear threshold may relate to a value of the length L of the brake discs 202. When the length L is reduced down to the brake wear threshold, it may be deemed that the brake 200 requires a service or a replacement. The brake wear threshold may be a conservative threshold based on worst case scenario operating conditions. However, even when the length L has reached the brake wear threshold, the brake discs 202 may not be completely worn. For example, the brake discs 202 may have sufficient length and the brake 200 may have sufficient mass for safe use, depending on the operating conditions. For example, the brake 200 may be capable of safe use for any potential braking applications under the prevailing operating conditions despite the brake wear threshold being reached. In such examples, it may not be necessary to perform a service in relation to the brake 200 before the flight in question.

For example, the brake 200 may be capable of performing a future rejected take-off event for certain operating conditions. A rejected take-off event requires intense braking in order to abort a take-off and may be performed at high speeds. If the brake 200 is capable of performing a rejected take-off event, it may be deemed capable of safe use. In the following examples, the future rejected take-off event relates to aborting take-off at a speed referred to as the decision speed (V1). Regulations require that an aircraft is able to perform a rejected take-off and stop before the end of the runway at any time before the speed V1 for that aircraft is reached. V1 is the speed above which the take-off should no longer be aborted (e.g. even if an engine fails or another problem occurs). This is because, for example, a rejected take-off event performed beyond V1 may lead to the aircraft 100 overrunning the runway and causing and/or sustaining serious damage.

The amount of brake wear and oxidation affect the mass of the brake discs 202 which undergo oxidation and wear. However, references are made simply to the mass of the brake 200 hereafter. The mass of the brake 200 may affect its performance. The brake 200 may have sufficient mass for safe use for given operating conditions despite having lost mass by reaching the specified brake wear threshold. For example, the brake 200 may have sufficient mass to perform the future rejected take off event.

Figure 3:
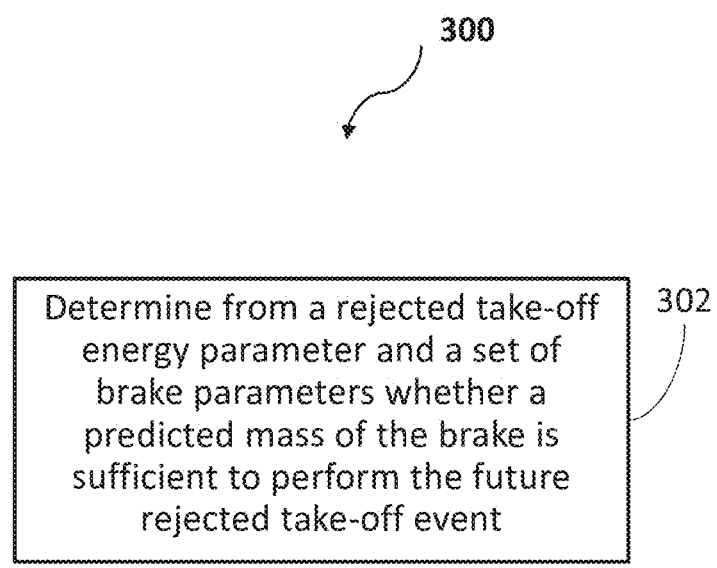
FIG. 3 is a first flow diagram of a first exemplary method of determining whether an aircraft wheel brake is capable of performing a future rejected take-off event.

FIG. 3 is a flow diagram of a method 300. A non-transitory computer readable storage medium (hereafter referred to as storage medium) having stored thereon instructions which, when executed by a processor, cause the processor to perform the method 300 may be provided. The method 300 is for determining whether the brake 200 is capable of performing a future rejected take-off event. At block 302, it is determined from a rejected take-off energy parameter and a set of brake parameters whether a predicted mass of the brake 200 is sufficient to perform the future rejected take-off event.

The rejected take-off energy parameter may indicate the amount of kinetic energy the aircraft 100 would need to lose to perform the future rejected take-off event. As discussed, the future rejected take-off event is a rejected take-off when the aircraft 100 is moving at speed V1. The V1 speed of the aircraft 100 may depend on the performance characteristics of the aircraft 100, the ambient conditions, runway length and a weight of the aircraft 100, which are examples of operating conditions. The performance characteristics of the aircraft 100 may include thrust settings, V-rotate (which is defined as the speed at which the pilot may begin to apply control inputs to cause the aircraft nose to pitch up after which it leaves the ground), and the like. The ambient conditions may include conditions such as altitude, temperature, wind strength and direction, specific characteristics of the runway in question, and precipitation level.

The set of brake parameters may comprise an upper temperature cut-off for the brake 200. The upper temperature cut-off may be a temperature at which the performance of the brake 200 declines, a fuse plug of the respective wheel 104 melts to relieve pressure, the brake discs 202 experience thermal oxidation, the respective axle receives thermal damage, and/or the like. It may be desired that the temperature of the brake 200 does not exceed the upper temperature cut-off. The set of brake parameters may also comprise parameters indicating physical properties of the brake 200. For example, the set of brake parameters may comprise the specific heat capacity of the brake 200. The specific heat capacity of the brake 200 may be a function of certain variables such as temperature.

The predicted mass of the brake 200 may be a predicted current mass of the brake 200 or a predicted future mass of the brake 200. In examples where the future rejected take-off event is a rejected take-off event that may potentially occur during a next flight, the predicted current mass of the brake 200 may be used. In examples where the future rejected take-off event is a rejected take-off event that may potentially occur after a number of future flights have taken place, the predicted future mass of the brake 200 may be used. The predicted future mass of the brake may be determined based on a predicted current mass.

The predicted mass may be determined based on a predicted oxidation state of the brake 200 and a wear state of the brake 200. As discussed, oxidation and wear result in a loss of mass of the brake 200. The predicted oxidation state of the brake 200 may be expressed as an amount of mass lost from the brake 200 due to oxidation. As discussed, the wear state of the brake 200 may be expressed as a reduction in the length L of the brake discs 202. Given the density (which may take into account the level of oxidation) and surface area of the brake discs 202, an amount of mass lost due to brake wear may be determined from the reduction in length. The amount of mass lost due to oxidation and the amount of mass lost due to wear may be subtracted from the original mass of the brake 200 (i.e. the mass of the brake 200 when it was new and unused) in order to predict the mass of the brake 200.

In examples where the predicted current mass of the brake 200 is to be determined, the predicted current oxidation state and the current wear state may be used. In examples where the predicted future mass of the brake 200 is to be determined, a predicted future oxidation state and a predicted wear state, which is a predicted future wear state, may be used. The way in which the predicted current and future oxidation state of the brake 200 may be determined is described in further detail hereafter. Furthermore, the way in which the wear state may be measured and the future wear state may be predicted is described in further detail hereafter.

Figure 4A:
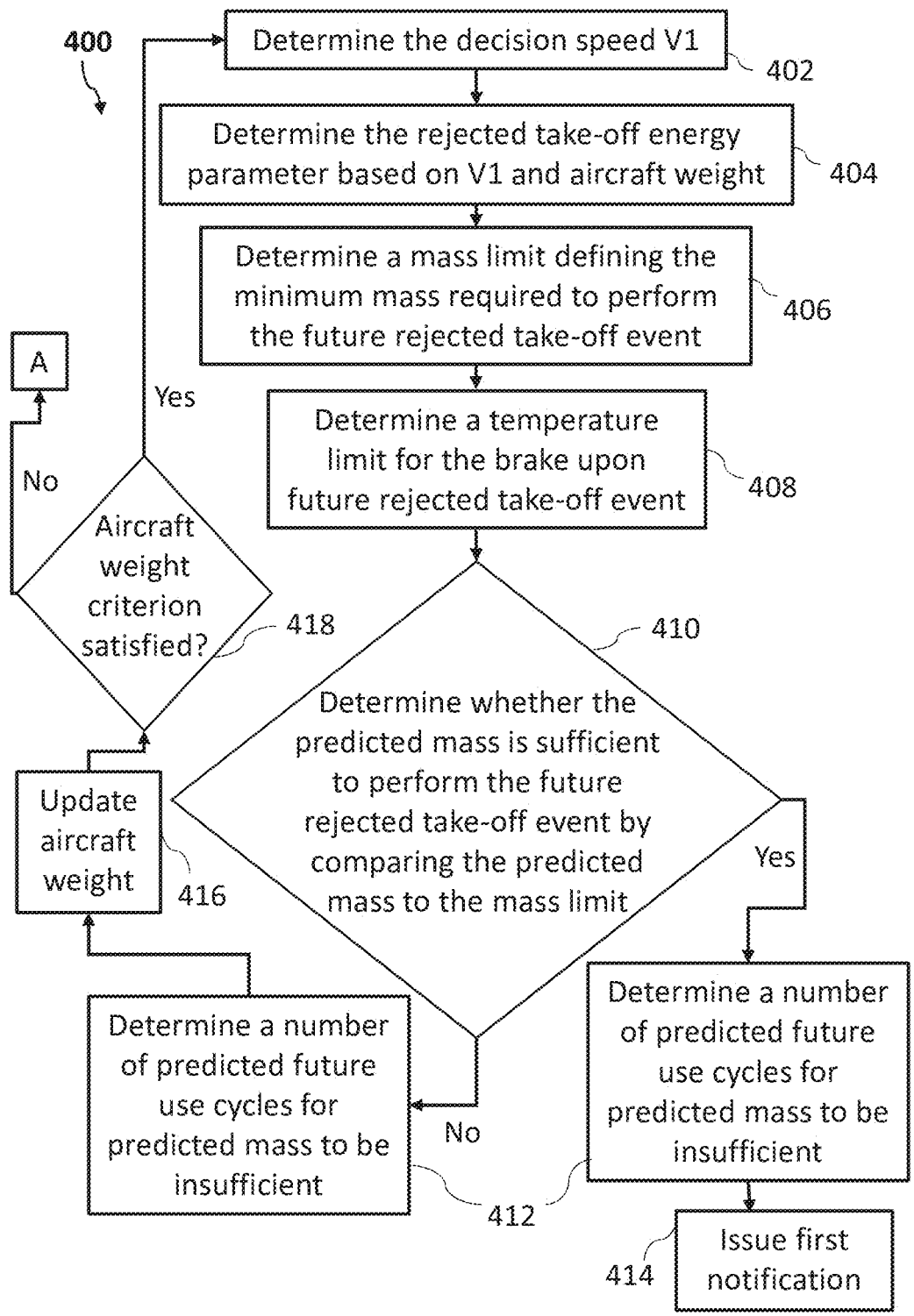
FIG. 4a is a second flow diagram of a part of a second exemplary method of determining whether an aircraft wheel brake is capable of performing a future rejected take-off event.
Figure 4B:
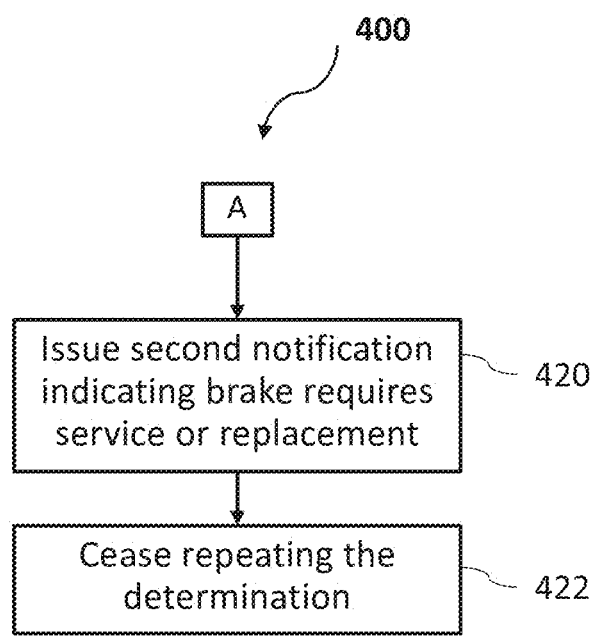
FIG. 4b is a is a third flow diagram of a part of the second exemplary method of determining whether an aircraft wheel brake is capable of performing a future rejected take-off event.

Further details of how to determine whether the predicted mass of the brake is sufficient to perform the future rejected take-off event will be described in the following. FIGS. 4a and 4b are flow diagrams of a method 400 showing acts that may be performed as part of the method 300. The method 400 also comprises acts in addition to determining whether the predicted mass of the brake is sufficient to perform the future rejected take-off event. Blocks of the method 400 may be performed in various different orders and/or certain blocks may be omitted, as far as is feasible, so long as it is determined whether or not the brake 200 is capable of performing a rejected take-off event. The non-transitory computer readable storage medium may store instructions which, when executed by the processor, cause the processor to perform all or part of the method 400.

At block 402 of the method 400, the decision speed V1 is determined. As discussed, the V1 speed may depend on the performance characteristics of the aircraft 100, the ambient conditions, runway length and a weight of the aircraft 100, which are examples of operating conditions. For example, the storage medium may store instruction which, when executed by the processor, cause the processor to determine the V1 speed using these factors. Information regarding these factor may be received by the processor from sensors 108 of the aircraft 100, retrieved from computer readable storage media and/or input by a user of the processor.

In some examples, a maximum take-off weight, which may be the maximum weight the aircraft 100 is specified to fly with, may be used to determine the V1 speed. In some examples, the measured aircraft weight (i.e. the actual current weight of the aircraft 100) may be used. In some examples, an estimated aircraft weight may be used. For example, the aircraft weight may be estimated by summing the known un-laden weight of the aircraft 100, a fuel weight estimate, a passenger and crew weight estimate, and a luggage weight estimate. In some examples, the aircraft weight may be estimated by adding a proportion of the aircraft's weight capacity (based on the number of passengers on the flight, etc.) to the known un-laden weight. In the following discussion, reference is simply made to the aircraft weight. As will be described hereafter, the method 400 may be repeated (in an iterative fashion) using different operating conditions. In some examples, the method 400 may be performed using the measure (or estimated) aircraft weight and may be repeated using an updated aircraft weight value which is an updated value input into the method 400 for the purpose of repeating the method 400.

At block 404, the rejected take-off energy parameter may be determined based on the aircraft weight and the speed V1. In some examples, the rejected take-off energy parameter may be determined based on a set of user input parameters. For example, a user may input a set of parameters which indicate one or more of the operating conditions based on which blocks 402 and 404 are performed. Accordingly, the user may perform the methods described herein for various different operating conditions.

At 406 of the method 400, a mass limit defining the minimum mass (i e minimum mass of the brake 200) required to perform the future rejected take-off event is determined. The mass limit may be determined using an amount of energy to be absorbed by the brake 200 when performing the future rejected take-off event. It should be noted that all of the brakes of the aircraft 100 that are applied during the future rejected take-off event may absorb some of the kinetic energy of the aircraft 100. The mass limit is determined using an amount of energy to be absorbed by the specific brake with respect to which the method 400 is being performed. Accordingly, the amount of energy (i.e. the proportion of the total kinetic energy the aircraft 100 has to lose during the rejected take-off event) to be absorbed by the brake 200 is determined and used to determine the mass limit.

In some examples, the amount of energy to be absorbed by the brake 200 may be determined based on gain characteristics of the brake 200. The gain characteristics of the brake 200 may indicate certain physical properties of the brake 200. For example, the gain characteristics may indicate the amount of energy the brake 200 is expected to absorb for a given applied force. Each of the brakes of the aircraft 100, which may be applied during the future rejected take-off event, may have its own gain characteristics. The amount of energy the aircraft 100 has to lose to come to a stop during the future rejected take-off event may be divided among the brakes to be applied taking into account the respective gain characteristics.

In the context of the future rejected take-off event, the maximum force with which the brake can be applied may be used. For example, the amount of energy each of the brakes to be applied is expected to absorb, given the maximum brake application force, for the amount of time required for the aircraft 100 to come to a stop, may be taken into account. The amount from the total energy the aircraft 100 has to lose, which is to be absorbed by the brake 200 may accordingly be determined. The maximum force may depend on the force which can be delivered by the hydraulic/electrical actuation system of the brake 200 when a pilot forcefully applies all brakes to perform the future rejected take-off event. In some simpler examples, the total energy which the aircraft 100 has to lose during the future rejected take-off event, as indicated by the rejected take-off energy parameter, may be divided by the number of brakes of the aircraft 100 to be applied to estimate the amount of energy to be absorbed by the brake 200 with respect to which the method is being performed. However, it should be noted that such an approach would not take into account differences between individual brakes. In some examples, when determining the energy to be absorbed by the brake 200, it may be assumed that there is a loss of braking on one of the wheels of the aircraft 100 (e.g. to account for a worst case scenario).

As discussed, the set of brake parameters may comprise an upper temperature cut-off and the specific heat capacity of the brake 200. The mass limit of the brake 200 may be determined using the amount of energy to be absorbed by the brake 200 and the specific heat capacity of the brake 200 such that the brake 200 does not exceed the upper temperature cut-off. The mass limit may also take into account the physical size and density of the brake discs 202 (for example, using the predicted oxidation state of the brake 200), such that the mass limit relates to a minimum size and density which would allow safe functioning of the brake 200.

A temperature limit which is the maximum temperature the brake 200 is expected to reach upon the future rejected take-off event taking place may be determined. In the example of the method 400, the temperature limit is determined at block 408. The temperature may be determined using the amount of energy to be absorbed by the brake 200, the predicted mass and the specific heat capacity of the brake 200, for example.

At block 410, whether the predicted mass of the brake 200 is sufficient to perform the future rejected take-off event is determined.

In some examples, whether the predicted mass is sufficient may be determined by comparing the predicted mass to the mass limit. For example, if the predicted mass is less than the mass limit, it may be determined that the predicted mass is not sufficient to perform the future rejected take-off event. On the other hand, if the predicted mass is greater than the mass limit, it may be determined that the predicted mass is sufficient to perform the future rejected take-off event.

In some examples, whether the predicted mass is sufficient may be determined by comparing the temperature limit to the upper temperature cut-off. For example, if the temperature limit is less than the upper temperature cut-off, it may be determined that the predicted mass is sufficient to perform the future rejected take-off event (because the brake 200 is not expected to get too hot). On the other hand, if the temperature limit is greater than the upper temperature cut-off, it may be determined that the predicted mass is not sufficient to perform the future rejected take-off event.

In examples where the future rejected take-off event is one that may potentially occur during the next flight, the predicted mass used may be the predicted current mass of the brake 200 determined based on the predicted current oxidation state of the brake 200 and the current wear state of the brake 200. In examples where the future rejected take-off event is one that may potentially occur after a given number of flights, the predicted future mass may be determined based on the predicted future oxidation state after the given number of flights and the predicted future wear state after the given number of flights.

The method may proceed to block 412 irrespective of the result of this determination. Block 412 is an optional block which may be performed and is described in further detail in the following. At block 412 of the method 400, a number of predicted future use cycles of the brake 200 after which the predicted mass is expected to be insufficient to perform the future rejected take-off event is determined. The number of predicted future use cycles after which the predicted mass is expected to be insufficient is hereafter referred to as the predicted brake mass cycles. A use cycle of the brake 200 may be the time from when the aircraft 100 with the brake 200 installed thereon is at a departure gate before a flight to when the aircraft 100 is at an arrival gate after a flight. For example, a use cycle comprises all uses of the brake 200 relating to a respective flight undertaken by the aircraft 100. Therefore, as used herein, a use cycle relates to a complete flight of the aircraft 100. A predicted future use cycle may be a use cycle of the brake 200 which has yet to occur.

The predicted brake mass cycles may be determined by comparing values of predicted future mass to the mass limit. It should be noted that in the example where the future rejected take-off event relates to the next flight and where it is determined that the predicted current mass is insufficient, the predicted brake mass cycles are zero for the operating conditions (e.g. aircraft weight) in question. In examples, where the future rejected take-off event relates to the next flight and where it is determined that the predicted current mass is sufficient, the predicted brake mass cycles are at least one.

Values of the predicted future mass the brake 200 for respective predicted future use cycles may be compared to the mass limit in sequence. For example, the predicted future mass for a first given predicted future use cycle may be compared to the mass limit. If the predicted future mass for the first given predicted future use cycle is greater than the mass limit, the predicted future mass for a second given predicted future use cycle may be compared to the mass limit. The second given predicted future use cycle may be the next cycle immediately after the first given predicted future use cycle. The comparison may continue sequentially in this manner until the predicted future mass for a particular predicted future use cycle is less than the mass limit. The predicted brake mass cycles may be determined as the number of predicted future use cycles yet to occur, which is one fewer than the particular predicted future use cycle at which the predicted future mass drops below the mass limit. In this way an indication of when the brake 200 may require a service or replacement may be provided. Advantageously, such a determination may allow planning of servicing and replacement work while avoiding delays to flights due to the discovery of issues with the brake 200 prior to a flight.

A first notification may be issued, if the predicted mass is determined to be sufficient to perform the future rejected take-off event. When the determination of block 410 is made using the prevailing operating conditions such as the measured aircraft weight, the first notification may indicate that the predicted mass is sufficient to perform the future rejected take-off event for the prevailing operating conditions, e.g. the measured aircraft weight. The content of the first notification may vary depending on the operating conditions for which the determination of block 410 is made, as will be described hereafter. In the method 400, if it is determined that the predicted mass is sufficient, the method 400 proceeds to block 414. At block 414, the first notification is issued. The determination of whether the brake 200 is capable of performing the future rejected take-off event may be repeated, if the predicted mass is determined to be insufficient to perform the future rejected take-off event. For example, the determination may be repeated using updated operating conditions. If at block 410 it is determined that the predicted mass is not sufficient, the method 400 proceeds to block 416. At block 416, an updated value of the aircraft weight is input into the method for the purpose of repeating the determination of whether the brake is capable of performing the future rejected take-off event. It should be noted that the updated value of the aircraft weight does not relate to an actual prevailing weight of the aircraft 100, but is merely a value input into the method 400 to repeat the determination to check whether the brake 200 is capable of performing the future rejected take-off event for different operating condition (e.g. a different aircraft weight). For example, the updated value may be lower than the measured (or estimated) aircraft weight. For example, the updated value may be a given amount lower than the measured (or estimated) aircraft weight. In some examples, the given amount may be the estimated weight of one passenger and their luggage. An example of the given amount is 100 kg. The updated value of the aircraft weight which is input for the purpose of repeating the determination may be the given amount lower than the previous value each time the determination is repeated. In this manner the determination may be iterated for various different values of aircraft weight.

A second notification indicating that the brake 200 requires a service or replacement may be issued, and the repeating of the determination may be ceased, responsive to the updated value of the aircraft weight satisfying an aircraft weight criterion. In the example of the method 400, at block 418, it is determined whether the aircraft weight criterion is satisfied by the updated value of the aircraft weight. The aircraft weight criterion may simply be a low aircraft weight limit below which it is not desirable and/or feasible to embark on a flight, for example.

If the aircraft weight criterion is satisfied, the method 400 proceeds to block 402. In this way, the determination is repeated if it is determined that the predicted mass is not sufficient using different operating conditions (in this case the updated value of the aircraft weight). When block 402 is repeated, the decision speed V1 is determined based on the updated value of the aircraft weight. Similarly, when the block 404 is repeated, an updated rejected take-off energy parameter is determined based on the updated value of the aircraft weight. It should be noted that for a lower aircraft weight value the rejected take-off energy parameter may indicate that the aircraft 100 would have to lose a lower amount of energy to perform the future rejected take-off event. The method 400 may proceed as described above towards block 410. If, at block 410, it is determined that the predicted mass is sufficient to perform the future rejected take-off event (for the updated value of the aircraft weight), the method proceeds to block 414 (optional block 412 may also be performed). At block 414 the first notification is issued. In this case, the first notification indicates that while the predicted mass is insufficient to perform the future rejected take-off event for the measured aircraft weight, the predicted mass would be sufficient to perform the future rejected take-off event for the updated value of the aircraft weight. Responsive to the first notification, the pilot and/or other crew concerned with the aircraft 100 have the option to alter the actual weight of the aircraft 100 (e.g. by unloading luggage and the like) to proceed with the flight in a safe manner.

Accordingly, in the example of the method 400, by repeating the determination, operating conditions, namely an aircraft weight in this example, may be found for which the brake 200 is capable of performing a rejected take-off event.

In the example of the method 400, if it is determined at block 418 that the aircraft weight criterion is not satisfied, the method 400 proceeds to block 420 shown in FIG. 4b. (Note that the transition from the blocks in FIG. 4a to the blocks in FIG. 4b is indicated by the box "A"). It should be noted that the method 400 proceeds to block 420 when it has been determined that the predicted mass of the brake 200 is not sufficient to carry out the future rejected take-off event for any of the values of the aircraft weight with which the determination of the method 400 have been carried out.

At block 420, the second notification is issued. At block 422, the repetition of the determination as to whether the brake is capable of performing the future rejected take-off event is ceased. This may occur in examples where the processor carrying out the described methods has a means of communicating with the braking system of the aircraft 100.

Figure 5:
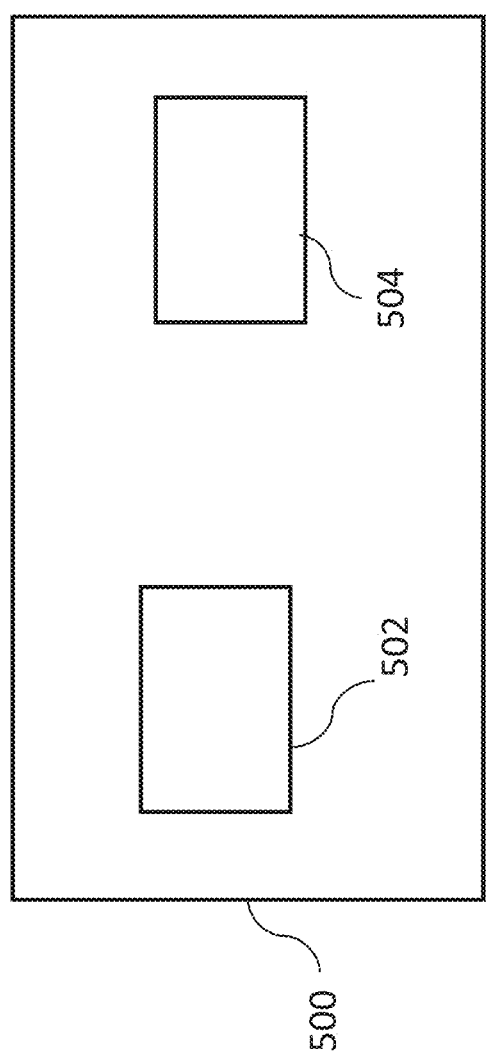
FIG. 5 is a schematic view of a computing apparatus for performing examples of the methods of the invention.

The described storage medium may be used with a processor of a computing apparatus. For example, all or parts of the methods described herein may be performed by one or more processors of the computing system 106 of the aircraft 100. In some examples, one or more processors of computing apparatus at a maintenance control centre relating to the aircraft 100 may perform all or parts of the described methods. In some examples, one or more processors of computing apparatus of an electronic flight bag used by members of the flight crew of the aircraft 100 may perform all or parts of the described methods. FIG. 5 is a simplified schematic view of an apparatus 500 which is a computing apparatus for performing all or parts of the methods described herein. The apparatus 500 comprises a processor 502 and a storage medium 504. The storage medium 504 may be the storage medium as described and may therefore store instructions which, when executed by the processor 502, cause the processor 502 to perform all or parts of the methods described herein.

Further methods which may be performed based on the instructions stored in the storage medium 504 are described in the following.

Ways in which the wear state of the brake 200 and the predicted wear state may be determined is described in the following. In the case where the brake 200 is electrically actuated and being controlled by an e-brake controller, the measured wear value may be the length L of the brake discs 202 measured by the e-brake controller. The e-brake controller may control the position of the pressure plate 204 relative to the reaction plate 206, for example, and may therefore be able to measure the length L.

In the case where the brake 200 is hydraulically actuated, a brake wear sensor 216 configured to measure the wear value may be provided. The brake wear sensor 216 may comprise a linear variable differential transformer (LVDT) sensor, or a Hall Effect sensor, configured to measure the linear displacement of a component of the brake 200. For example, such a brake wear sensor 216 may measure the linear displacement of the pressure plate 204 when the brake 200 is fully applied and the length L may be derived from the measured linear displacement.

In some examples, the measured wear value may be the remaining length of a wear pin (not shown) associated with the brake 200, for example. The wear pin may be a component which provides an indication of the change in the length L of the brake discs 202. For example, a reduction in the remaining length of the wear pin may correspond to a reduction in the length L of the brake disks 202. The remaining length of the wear pin may be the length of the wear pin which extends out from a component of the brake 200. For example, the remaining length of the wear pin may be its length which extends out from a surface of a piston housing of the brake 200, or another surface of the housing of the brake 200.

The wear pin may move together with the brake discs 202, and relative to the surface with respect to which its remaining length is measured. The wear sensor 216 may be a sensor which is fixed relative to the surface with respect to which the remaining length of the wear pin is measured. Such a sensor may measure the position of the wear pin relative to said surface and may therefore measure the change in the remaining length of the wear pin.

The predicted wear state may be the wear state the brake 200 is predicted to be in after future use cycles of the brake 200 have taken place. The wear state of the brake 200 may be represented by the measured wear value, e.g. the remaining length of the wear pin as measured by the brake wear sensor 216. As described, as the brake 200 becomes more worn, the length L of the brake discs 202 decreases. Therefore, the measured wear value as defined herein decreases as use cycles take place. The predicted wear state may be represented by a predicted wear value which may be a predicted length relating to the brake 200, e.g. a predicted remaining length of the wear pin. In the examples described hereafter, the actual and predicted wear states are represented by measured and predicted wear values which decrease as the brake 200 becomes more worn.

The predicted wear state may be determined based on the wear state of the brake 200. For example, a wear relationship between the wear state and the number of use cycles of the brake 200 may be determined. The predicted wear state may be determined based on the wear relationship as described hereafter. The wear relationship may be determined based on one or more of the measured wear values. For example, the wear state may be measured for a number of use cycles that take place and considered with respect to the total number of use cycles of the brake 200 that have taken place. In the examples described hereafter, the wear state is measured for each use cycle that takes place.

Figure 6:
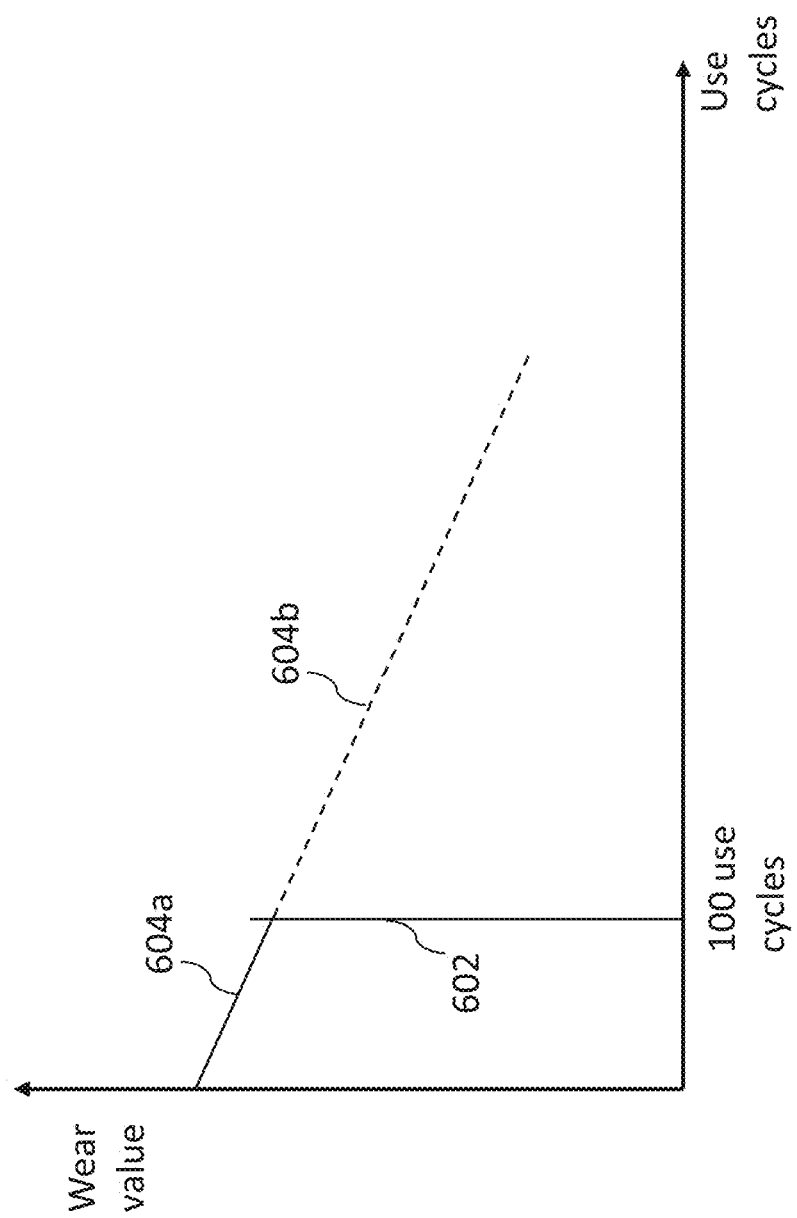
FIG. 6 is a graph illustrating the condition of an aircraft wheel brake as a function of the number of use cycles of the brake, according to an example.

FIG. 6 is a graph illustrating the wear state and the predicted wear state as a function of the number of use cycles of the brake 200 according to an example. The vertical axis of the graph of FIG. 6 represents the wear value (measured or predicted), whereas the horizontal axis represents the number of use cycles. In this example, a hundred use cycles have taken place (i.e. the aircraft 100 has undertaken 100 flights with the brake 200 installed). Therefore, values of the wear state as measured by the brake wear sensor 216 for each of the use cycles that have taken place are to the left of the line 602. The line 602 is a vertical line intersecting the horizontal axis at one hundred use cycles. Individual values of the wear state are not shown for convenience. Instead, the solid line 604a which is fitted to the values of the wear state is shown.

The solid line 604a may be determined using any known data fitting method. For example, Simple Linear Regression analysis may be used to determine the solid line 604a. Examples of other methods of fitting data include the Least Square method, Least Absolute Residual method, Bisquare fitting method, etc. It will be appreciated that any suitable data fitting method may be used.

In this example, a linear function is used to fit the values of the wear state to generate the solid line 604a, which is a straight line. However, in some examples, a different function may be used. For example, a polynomial function, an exponential function or another function which can describe the decrease of the wear state values as a function of use cycles may be used.

As described, a linear function is used in the example of FIG. 6. The linear function may be expressed according to Equation 1 below:

$$y = mx + c \tag{1}$$

In Equation (1) above, y represents values of the wear state, x represents the number of use cycles, m represents the amount of brake wear per use cycle (i.e. the gradient of the linear fit to the values of the wear state), and c represents the wear state when no use cycles have taken place (i.e. the value of the measured wear value when no use cycles have taken place—this may be the starting length of the wear pin, for example).

By fitting the values of the wear state, the values of the parameters in the fit function being used which are unknown may be determined. In this example, the value of m may be determined by fitting the values of the wear state using Equation (1). The function which is used to fit the wear state values and the parameters determined from the fit represent the wear relationship.

In order to determine a predicted wear state (i.e. a predicted wear value in this example) after a given number of use cycles have taken place, that given number of use cycles may be inserted into Equation (1) as a value of parameter x. Then, using the values of the parameters known from the fit on the right-hand side of Equation (1), the predicted wear state after that given number of use cycles may be calculated (i.e. the value of parameter y when x is equal to the given number of use cycles). In FIG. 6, the dashed line 604b represents values of the predicted wear state as a function of the number of use cycles. In other words, a line (i.e. the dashed line 604b—according to the fit function and determined parameters) may be determined for values of the number of use cycles greater than the number of use cycles that have actually taken place. In this example, the predicted wear states for respective number of use cycles are the values falling on the dashed line 604b.

Figure 7:
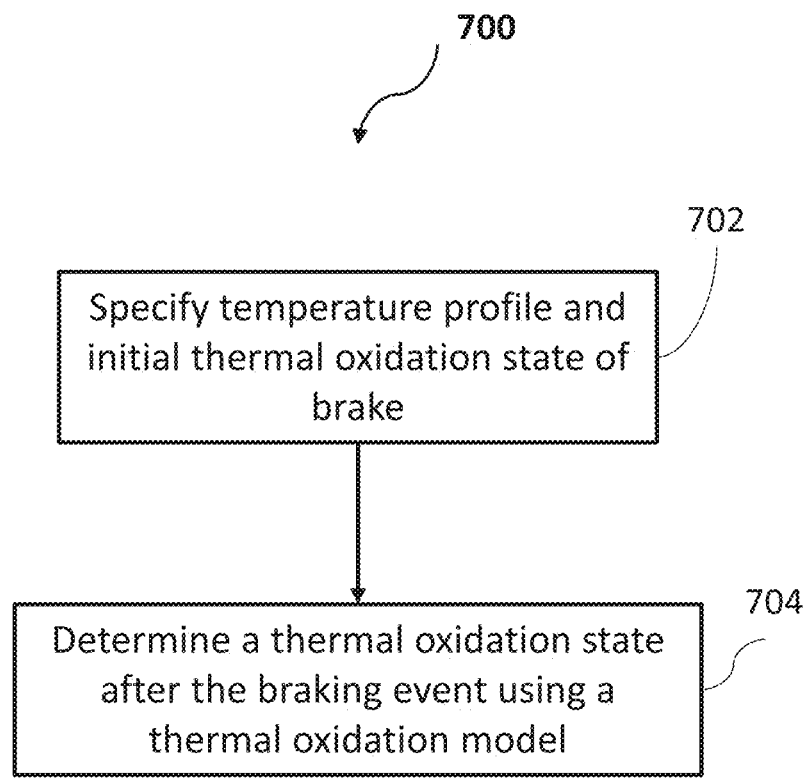
FIG. 7 is a flow diagram of an exemplary method of determining the thermal oxidation state of a brake of an aircraft landing gear.

FIG. 7 summarizes a method 700, according to an embodiment of the present invention, of determining a thermal oxidation state of a brake, such as the brake assembly 200, of an aircraft landing gear assembly 102. The method 700 involves determining a thermal oxidation state of the brake assembly 200 after a braking event, using a thermal oxidation model based on an initial thermal oxidation state (which may also be referred to as the initial thermal oxidation level) before the braking event and a temperature profile of the brake with respect to time. The determined thermal oxidation state of the brake assembly 200 after the braking event may be referred to as an updated thermal oxidation state. This is because the thermal oxidation state of the brake assembly 200 after the braking event takes account of the change in the initial thermal oxidation state due to the braking event.

The braking event is an event relating to the application of the brake assembly 200. For example, a braking event may comprise one or more applications of the brake assembly 200 to slow or stop the aircraft 100. In some examples, the braking event may be a part of a time during which the brake assembly 200 is continuously being applied. Any time the brake assembly 200 is applied, the temperature of the brake assembly 200 may rise. This is because when brake assembly 200 is applied to reduce the speed of the aircraft 100, some of the kinetic energy of the aircraft 100 is absorbed into the brake assembly 200 as heat causing its temperature to rise. Therefore, whether or not the brake assembly 200 has been applied can be determined based on temperature variations of the brake assembly 200.

At block 702 of the method 700, the temperature profile and the initial thermal oxidation state of the brake assembly 200 are input. As explained above, the temperature profile indicates a variation of temperature with time. The input temperature profile may, for example, relate to a use cycle of the aircraft 100. For example, the temperature profile may be for an entire use cycle of the aircraft 100, e.g. the time from when the aircraft 100 is at a departure gate before a flight to when the aircraft 100 is at an arrival gate after a flight. Specifically, the temperature profile may indicate the variation of temperature over time for all braking events that take place during a cycle. In other examples, the temperature profile may not be for an entire use cycle of the aircraft 100. For example, the temperature profile may be over a single braking event, or a part of a cycle with many braking events. In some examples, a number of temperature profiles belonging to a particular use cycle may be used to determine the thermal oxidation state of the brake assembly 200 after that use cycle.

The temperature profile may, for example, relate to a use cycle that has occurred. In other words, the temperature profile may include actual data from the temperature sensor 218 of the aircraft 100 during a previous use cycle. In such examples, the temperature profile relates to real data. On the other hand, in some examples, the temperature profile may be a predicted temperature profile of a predicted future use cycle of the aircraft 100. In that context, a braking event may be a predicted future braking event.

The temperature profile (in examples where it includes actual data) may be obtained from a temperature sensor 218 associated with the brake 200 (see FIG. 2). The temperature sensor 218 may be provided in thermal contact with one of the brake discs. In the example of FIG. 2, the temperature sensor 218 is provided on the stator 210. In this example, the stator 210 is the brake disc likely to reach the highest temperatures. The temperature sensor 218 may be any type of temperature sensor suitable for use in an aircraft brake assembly. For example, the temperature sensor 218 can function properly at the temperature ranges likely to be reached by the brake discs 202. For example, the temperature sensor 218 may be a thermocouple, a surface acoustic wave (SAW) sensor, an eddy current sensor, a resistance thermal sensor, a strain gauge, or the like. If a temperature sensor is provided on a part of the brake 200 other than on one of the brake discs 202, the temperature of the brake discs 202 may be determined using an indication of the relationship between a temperature measured by said temperature sensor and the temperature of the brake discs 202. In some examples, the indication of the relationship may be determined by experiment. In some examples, the indication of the relationship may be determined using a brake thermal model.

The temperature sensor 218 may measure the temperature of the stator 210 at given measurement intervals during a period of time when use of the brake 200 is expected. The lengths of the given measurement intervals may vary. The given measurement intervals may be regular, irregular or regular for one period of time and irregular for another period of time. For example, the temperature sensor 218 may measure the temperature such that a profile of the temperature of the stator 210 is captured with respect to time. In other words, the temperature sensor 218 measures the temperature of the stator 210 at given measurement intervals such that temperature information as a function of time is captured. For example, a processor of the computing system 106 may control the operation of the temperature sensor 218 based on instructions stored in a computer readable storage medium of the computing system 106. Temperature measurements captured by the temperature sensor 218 may be stored in a storage medium of the computing system 106, for example, along with associated time data.

The initial thermal oxidation state of brake assembly 200 is the thermal oxidation state of the brake assembly 200 before the braking event for which the updated thermal oxidation state is being determined. For example, for a new brake assembly 200 installed in aircraft 100, the initial oxidation state may indicate no oxidation. In some examples, the initial oxidation state for a newly installed brake assembly 200 may be set at installation by aircraft maintenance personnel and may either indicate no oxidation or some oxidation as assessed by the person(s) performing the installation. In examples where the brake assembly 200 is not new, the initial oxidation state may be the oxidation state calculated at a previous instance of method 700 being performed. In some examples, a brake or a brake component which is not new may be installed on aircraft 100. If the temperature profile information for all previous braking events involving that brake or brake component is available, the thermal oxidation state at installation may be determined using the available temperature profile information using method 700, or by other methods disclosed herein.

At block 704 of method 700, a thermal oxidation state after the braking event (updated thermal oxidation state) is determined using a thermal oxidation model. For example, a thermal oxidation model is applied based on the input temperature profile and the initial thermal oxidation state of the brake assembly 200. A thermal oxidation model, for example, indicates how the thermal oxidation state is expected to change with time for various temperatures starting from the initial thermal oxidation state. A thermal oxidation model is a model of the evolution of the thermal oxidation of the brake. Which thermal oxidation model is used may depend, for example, on the initial thermal oxidation state. The details and selection of appropriate thermal oxidation models is described further below. In some examples, the method 700 may be performed live during a use cycle of the aircraft 100. In the case of the method 700 being performed live (i.e. in real time or near real time), the temperature profile used may be from the temperature data acquired thus far by the temperature sensor 218, for example. At block 704, therefore, it is determined how the oxidation state, starting from the initial oxidation state, has changed as a result of the increased temperature associated with the braking event in question.

After the updated thermal oxidation state has been determined, the initial thermal oxidation state may be set to the updated thermal oxidation state. In this way, the initial thermal oxidation state is kept up to date with all previous braking events. In examples where the temperature profile relates to more than one braking event, the method 700 may be performed again in order to determine an updated thermal oxidation state after a subsequent braking event. Updating the initial thermal oxidation state in this manner may ensure that the initial thermal oxidation state being used for a subsequent braking event accounts for all the previous braking events.

In examples where the temperature profile for an entire use cycle of the aircraft 100, the method 700 may be performed to determine respective updated thermal oxidation states after each braking event within that use cycle. It will be understood that this process may be carried out sequentially in relation to the chronology of the braking events. This is so that the determination of the updated thermal oxidation state for each of the braking events is done from a starting point (an initial thermal oxidation state) which takes account of all previous braking events.

In the method 700, the updated thermal oxidation state after a braking event may, for example, be determined based on a high temperature interval, the initial thermal oxidation state and a thermal oxidation rate parameter, using an appropriate thermal oxidation model.

Figure 8:
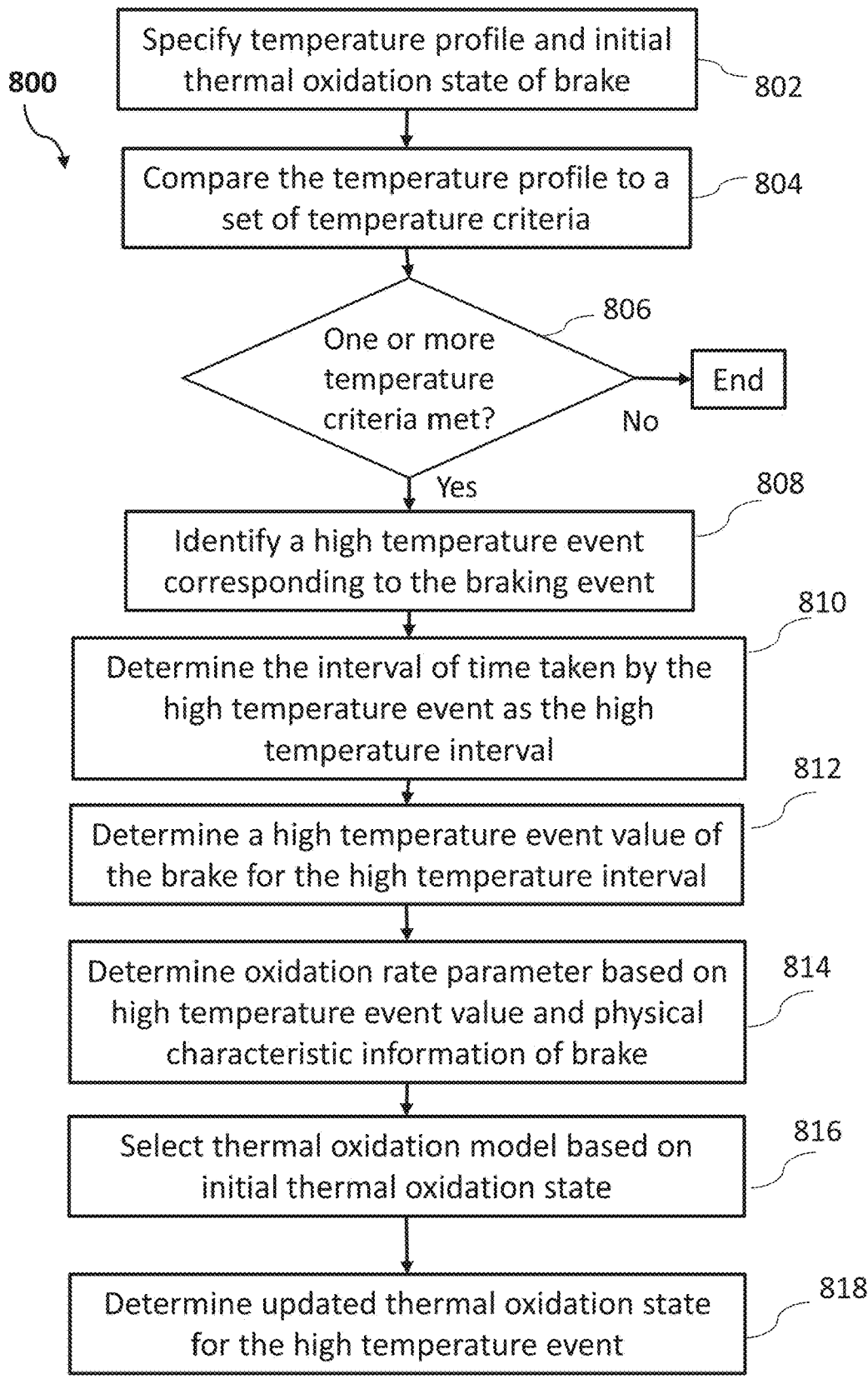
FIG. 8 is a flow diagram of an exemplary method of determining the thermal oxidation state of a brake of an aircraft landing gear.

FIG. 8 is a flow diagram of a method 800 showing acts that may be performed as part of method 700. For example, the method 800 involves more specific examples of the block 704 of the method 700. Block 802 is identical to block 702 of the method 700, in that a temperature profile of the brake with respect to time and the initial thermal oxidation state of the brake assembly 200 are input. At block 804, the temperature profile is compared to a set of temperature criteria. The set of temperature criteria may include a set of temperature thresholds. For example, the set of temperature criteria may include a first temperature threshold of 400° C. and a second temperature threshold of 750° C. In other examples, different temperature thresholds may be used depending on the physical properties of the brake assembly 200. The comparison of the temperature profile may, for example, take place sequentially in time order of the temperature data contained in the temperature profile. For example, a temperature value may be compared to the set of temperature thresholds, and subsequently, the next temperature value in time may be compared to the set of temperature thresholds.

At block 806, it is determined if one or more of the temperature criteria are met. If, for example, none of the temperature thresholds are exceeded, the method 800 ends. It will be appreciated that thermal oxidation of the CC composite of the brake discs 202 is a process that is most significant at high temperatures. A comparison of the temperature profile with the set of temperature thresholds therefore identifies high temperature events corresponding to braking events that may result in thermal oxidation. As mentioned above, a braking event is, for example, an application of the brake assembly 200. However, a high temperature event is an event during which the temperature of the brake assembly exceeds at least one of the temperature thresholds as a result of a braking event. For example, if during a braking event (i.e. a braking application) the temperature of the brake assembly 200 remains below all temperature thresholds, then no high temperature events occurred during that braking event. On the other hand, if during a braking event the temperature of the brake assembly exceeds a temperature threshold, the part of the braking event for which that temperature threshold is exceeded may be referred to as a high temperature event. If more than one temperature threshold is exceeded, a high temperature event may be the part of the braking event for which the highest temperature threshold is exceeded.

The temperature thresholds may be set based on temperatures above which a significant amount of thermal oxidation is expected to occur. Therefore, the method 800 ends if none of the temperature thresholds are exceeded. This is because, in this example, no braking events causing a sufficiently high temperature for thermal oxidation have occurred. In such examples, the updated thermal oxidation state after the braking event may simply be set to the initial thermal oxidation state before the braking event in question.

Figure 9:
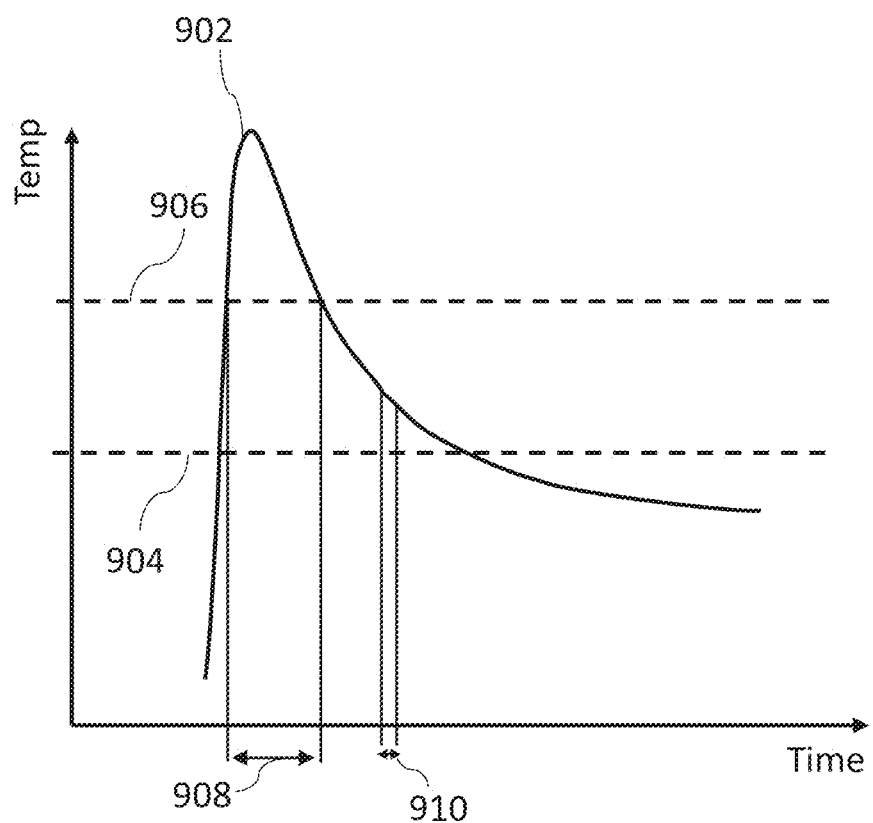
FIG. 9 is an exemplary graph illustrating the temperature of a brake with respect to time.

On the other hand, if at least one of the temperature thresholds is exceeded, at block 808 of the method 800, a high temperature event corresponding to the braking event in question is identified. A high temperature event corresponds to the part of the temperature profile which is above the highest of the exceeded temperature thresholds. This is because the part of the temperature profile which is above the highest of the exceeded thresholds corresponds to the part of the braking event for which the highest temperature threshold is exceeded. The identification of a high temperature event is described with reference to FIG. 9. FIG. 9 is a graph illustrating a part of an example temperature profile. In the graph of FIG. 9, the vertical axis represents temperature of the brake assembly 200, and the horizontal axis represents time. In this example, profile part 902 indicates that the temperature of the brake assembly 200 exceeds a first temperature threshold 904 and a second temperature threshold 906. In this example, the high temperature event is identified as the part of the profile 902 above the second temperature threshold 906 as the second temperature threshold 906 is the highest temperature threshold which is exceeded.

The amount of thermal oxidation which occurs above the second temperature threshold 906 may be significantly greater for a given interval of time compared to the thermal oxidation above the first temperature threshold 904 but below the second temperature threshold 906. Therefore, in this example, the parts of the temperature profile below the second temperature threshold 906 are not taken into account. In other examples, for example when the method 800 is used for live oxidation state monitoring as described further below, the parts of the temperature profile between the two temperature thresholds may be taken into account. It should be appreciated that the graph of FIG. 9 is merely an illustration of an example for explanatory purposes.

At block 810, the interval of time taken by the high temperature event is determined to be the high temperature interval. As mentioned above, the updated thermal oxidation state may be determined based on (among other factors) the high temperature interval. In the example of FIG. 9, the high temperature interval is determined to be the time interval 908.

At block 812, a high temperature event value of the brake assembly 200 is determined for the high temperature interval. The high temperature event value is a value of temperature ascribed to the high temperature event. In some examples, the high temperature event value is the average temperature during the high temperature interval. Alternatives to the high temperature event value being the average temperature are described below in the context of live oxidation monitoring.

At block 814, an oxidation rate parameter is calculated based on the high temperature event value and physical characteristic information of the brake. For example, the oxidation rate parameter for the thermal oxidation reaction may be determined based on the Arrhenius equation shown as Equation 2 below:

$$k(T)=Ae^{-E_A/RT} \quad (2)$$

In Equation 2, k(T) is the thermal oxidation rate, A is a pre-exponential constant, $E_A$ is the activation energy of the carbon atoms of the CC composite components of brake assembly 200, R is the universal gas constant and T is the temperature. In this example, for a particular high temperature event, the temperature T in Equation 2 is set to the high temperature event value for the purpose of block 814. In this example, the thermal oxidation rate k(T) is the oxidation parameter determined at block 814. The values of activation energy $E_A$, and the pre-exponential constant A may depend on the physical properties of the CC composite components of brake assembly 200 (in this example, the brake discs 202). For example, the values of these parameters may depend on the density, porosity, manufacturing process, contaminants present in the CC composite structures, the surface finish of the components and surface coatings of the brake assembly 200. The values of the activation energy $E_A$, and the pre-exponential constant A may also vary depending on the high temperature event value and the initial thermal oxidation state. Therefore, in order to determine the oxidation parameter, appropriate values of activation energy $E_A$, and the pre-exponential constant A may be selected based on the physical properties of the brake assembly 200, the high temperature event value and the initial thermal oxidation state before the braking event in question.

For example, the activation energy $E_A$ may be related inversely to temperature. The activation energy $E_A$ may become lower at a temperature at which oxygen molecules are able to penetrate past the surface of the brake discs 202 and oxidation of carbon deeper in the brake discs 202 can take place. The appropriate values of activation energy $E_A$, and the pre-exponential constant A may, for example, be determined experimentally for different initial thermal oxidation amounts, temperatures and physical properties of the brake being considered before the method 800 is implemented.

Figure 10:
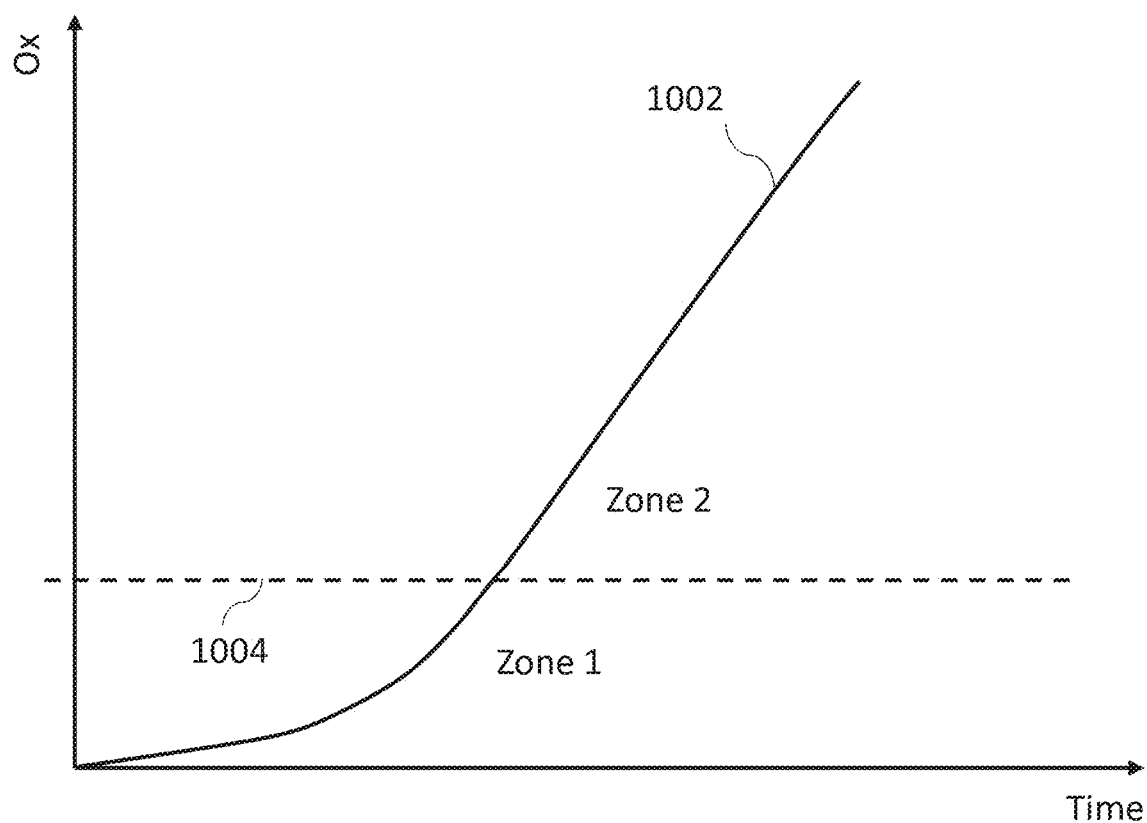
FIG. 10 is an exemplary graph illustrating the thermal oxidation state of a brake with respect to time for a specific temperature.

FIG. 10 is a graph of an example of the evolution with time of thermal oxidation of the brake discs of a brake assembly 200 for a specific temperature. The vertical axis of the graph in FIG. 10 represents a measure of the thermal oxidation indicated by the thermal oxidation state Ox. For example, the thermal oxidation state Ox may be the proportion of mass of the brake assembly 200 lost due to thermal oxidation of the brake discs 202. The evolution curve 1002 shows how the proportion of mass lost due to thermal oxidation advances with time at the specific temperature. It should be noted that a different evolution curve would indicate the variation of the thermal oxidation state Ox over time for a different temperature value.

In this example, the thermal oxidation state Ox advances with time differently below a thermal oxidation state level 1004, than it does above the thermal oxidation state level 1004. The thermal oxidation state Ox (i.e. mass lost due to thermal oxidation) is shown to increase non-linearly with time below oxidation state level 1004 and substantially linearly with time above oxidation state level 1004, in this example. In this example, the thermal oxidation state increases at an accelerated rate with time until thermal oxidation state level 1004 is reached. After thermal oxidation state level 1004 is reached, the rate of change of thermal oxidation state Ox with time remains generally constant. The part of the graph of FIG. 10 below thermal oxidation state level 1004 may be considered as a first thermal oxidation zone, namely Zone 1, and the part of the graph of FIG. 10 above thermal oxidation state level 1004 may be considered as a second thermal oxidation zone, namely Zone 2, for example.

In some examples, different values of the activation energy $E_A$, and the pre-exponential constant A may be used depending on which thermal oxidation zone the brake assembly 200 is in as indicated by the initial thermal oxidation state.

At block 816, a thermal oxidation model is selected based on the initial thermal oxidation state before the braking event. The thermal oxidation model describes the evolution of the thermal oxidation state Ox of the brake assembly 200 for different values of temperature. A thermal oxidation model which describes the evolution of the thermal oxidation state Ox in Zone 1 may be selected when the initial thermal oxidation state is in Zone 1. A thermal oxidation model which describes the evolution of the thermal oxidation state Ox in Zone 2 may be selected when the initial thermal oxidation state is in Zone 2. For example, a first thermal oxidation model, Model 1, may be selected for Zone 1, and a second thermal oxidation model, Model 2, may be selected for Zone 2. Model 1 for Zone 1, describing the non-linear change of thermal oxidation state Ox with time, may be represented by Equation 3. Model 2 for Zone 2, describing the linear change of thermal oxidation state Ox with time, may be represented by Equation 4 below.

$$Ox = 1 - [1 - \{k(T) \times t_{eq}(1-n)\}^{1/1-n}] \quad (3)$$

$$Ox = k(T) \times t_{eq} \quad (4)$$

In Equation 3 and Equation 4 above, k(T) is the thermal oxidation rate as defined by Equation 2. The parameter $t_{eq}$ is the equivalent time, which is the time it would take, at temperature T, to reach the thermal oxidation state Ox. The parameter n is referred to as the equation order and depends on the properties of the CC composite used in the brake assembly 200. The parameter n may, for example be experimentally determined for a brake using a particular CC composite.

In some examples, different thermal oxidation models to those described by Equations 3 and 4 may be used. In some examples, a single thermal oxidation model may be used which describes the evolution of the thermal oxidation state Ox for all thermal oxidation states Ox that are relevant to the brake assembly 200. In some examples, more than two thermal oxidation models may be used for respective ranges of thermal oxidation states Ox. The method 800 may be modified appropriately in order to use such alternative thermal oxidation models. For example, a different set of inputs may be applied to the thermal oxidation model, as appropriate, than are described in this specific example of the method 800.

It will be understood that block 816 may be performed at any stage of the method 800 once block 802 has been performed, because block 816 requires the initial thermal oxidation state.

At block 818, the updated thermal oxidation state for the high temperature event is determined using the selected thermal oxidation model based on the high temperature interval, the initial thermal oxidation state and the determined thermal oxidation rate parameter. For example, the time it would take to reach the initial thermal oxidation state from zero at the high temperature value is determined and the high temperature interval is added to this time in order to determine the value of $t_{eq}$ to be used in the selected thermal oxidation model. Inputting the thus determined value of $t_{eq}$, as well as the thermal oxidation parameter into the equation selected from Equations 3 and 4 above results in, as an output, the updated thermal oxidation state of the brake assembly 200 after the high temperature event.

The updated thermal oxidation state may be set to the new initial thermal oxidation state for a subsequent use of the method 800 for a subsequent high temperature event in the temperature profile.

In some examples, the method 700 and/or 800 may be performed live during a use cycle when braking events are taking place. In such examples, part of the method 800, for example, may be modified to allow live brake oxidation monitoring, and the temperature profile may correspond to temperature values being measured live. For example, temperature information which the temperature sensor 218 provides may continuously be compared to the set of temperature criteria as per block 804 of method 800, and high temperature events may be identified substantially as they occur. It will be understood that even though this kind of oxidation state monitoring is described as live, the extent to which it occurs in real time will depend on various hardware and software (e.g. processing speed) limitations. For example, there may be a time delay between temperature values corresponding to a high temperature event being measured by the temperature sensor 218, and those values resulting ultimately in updated thermal oxidation states of the brake assembly 200.

For example, high temperature events may be identified as smaller parts of the temperature profile than in the example described above. Referring again to FIG. 9, the part of the profile part 902 occurring within the time interval indicated as 910 may be taken to be a high temperature event and the interval 910 as its high temperature interval. In this example, the high temperature event value may be taken to be the temperature measured at the beginning or the end of the high temperature interval 910, for example, or the average of the two temperature values. Unlike the above example, in the case of live monitoring, parts of the temperature profile between the first and second temperature thresholds may be taken into account even when the temperature exceeds the second temperature threshold 906. In the case of live monitoring, any part of the temperature profile above at least one temperature threshold, such as the part identified by interval 910, may be identified as a high temperature event. It will be understood that such modifications may allow the thermal oxidation state of the brake assembly 200 to be updated as high temperature events corresponding to braking events are taking place. In some examples, high temperature events may be identified based on the time between subsequent temperature measurements taken by the temperature sensor 218. For example, the interval 910 may be the interval of time between subsequent temperature measurements taken by the temperature sensor 218.

The methods 700 and 800 may be used in order to determine the thermal oxidation state of the brake assembly 200 after an actual use cycle of the aircraft 100 or in a live manner during an actual use cycle. In such examples, this may be done based on one or more temperature profiles encompassing braking events within that use cycle. As mentioned above, in some examples, the thermal oxidation state of the brake assembly 200 is determined in respect of a use cycle which has actually occurred using temperature profile information collected by the temperature sensor 218.

On the other hand, in some examples, the method 700 or 800 may be used to predict a future thermal oxidation state of the brake assembly 200 after a first plurality of predicted future use cycles of the aircraft 100. The first plurality of future use cycles may be a number of cycles after which a thermal oxidation threshold is reached. Each predicted future use cycle may include a respective plurality of braking events. For each predicted future use cycle, the predictions may be based on a respective predicted temperature profile of the brake assembly 200 and a current thermal oxidation state. The current thermal oxidation state is, for example, the oxidation state taking into account all the previous braking events experienced by the brake assembly 200.

For example, the predicted temperature profiles may be input into the method 700 or 800, for example in time order, to determine the future thermal oxidation state of brake assembly 200. The predicted temperature profile of a predicted future use cycle may be predicted based on previous temperature profiles for previous actual use cycles of the aircraft 100. For example, using the parts of previous temperature profiles relating to the landing phase, landing phase parts of the temperature profile for a future use cycle may be predicted. For the purpose of predicting a future thermal oxidation state, high temperature intervals, high temperature event values, etc. may be stored in a computer readable storage medium when the method 700 or 800 is being carried out for actual use cycles of aircraft 100.

In some examples, data from previous cycles may not be available, for example, because brake the assembly 200 may be new. In some examples, enough data may not be available to reliably predict temperature profiles for predicted future use cycles. In such examples, predetermined temperature profiles may be used. The predetermined temperature profiles may be profiles typically expected for the future use cycle of aircraft 100.

The predicted temperature profiles may, for example, take into account the future flight schedule of the aircraft 100. For example, the aircraft 100 may be expected to land at an airport with a short runway requiring high energy (i.e. high temperature) braking upon landing for some of its predicted future use cycles. For those predicted future use cycles, the predicted temperature profiles may indicate high energy braking upon landing. It will be appreciated that various other factors may be taken into account when predicting temperature profiles such as taxiing time at various phases of a predicted future use cycle, waiting time between a taxiing phase and the preceding landing phase, and the like.

As mentioned above, the first plurality of predicted future use cycles may be a number of predicted future use cycles after which the predicted future thermal oxidation state reaches a thermal oxidation threshold. For example, the prediction of the future thermal oxidation state may stop after a cycle in which the thermal oxidation threshold is reached. In some examples, the prediction of the future thermal oxidation state may stop as soon as the thermal oxidation threshold is reached. The thermal oxidation threshold may be an oxidation state at which servicing or replacement of the brake assembly 200 or a component of the brake assembly 200 is required. For example, the brake assembly 200 may require a service if its mass is reduced by between 4% and 6.5%, for instance 5.7%, where the selected percentage threshold may vary depending, for instance, on the original, manufactured disc density. In this example, the first plurality of predicted future use cycles is the number of cycles it takes for the proportion of mass lost due to thermal oxidation to reach or exceed, for instance, 5.7% (i.e. being within the range 4% to 6.5%).

On the other hand, in some examples, the prediction of the future thermal oxidation state may stop at the end of a predicted future use cycle during which the future thermal oxidation state approaches close to the thermal oxidation threshold such that the future thermal oxidation state can be expected to reach the thermal oxidation threshold during the next predicted future use cycle. In such examples, the thermal oxidation threshold may be considered reached within the first plurality of predicted future use cycles. This is because, in reality, an aircraft 100 with a brake assembly 200 expected to reach the thermal oxidation threshold in a strict sense in the very next cycle would not be permitted to fly and a service or replacement relating to the brake assembly 200 may take place at that point.

Using the first plurality of predicted future use cycles, an indication may be given as to how many use cycles can take place before the brake assembly 200 or a component of the brake assembly 200 requires servicing or replacement due to thermal oxidation. In the examples where the thermal oxidation threshold is strictly reached or exceeded during the last of the first plurality of future cycles, the number of cycles before a service or replacement is required due to thermal oxidation may be predicted as one fewer than the number of cycles in the first plurality. In examples where the prediction of the future thermal oxidation state stops when the thermal oxidation threshold is expected to be reached in the next cycle after the first plurality, the first plurality is taken as the number of cycles before a service or replacement due to thermal oxidation is required.

Figure 11:
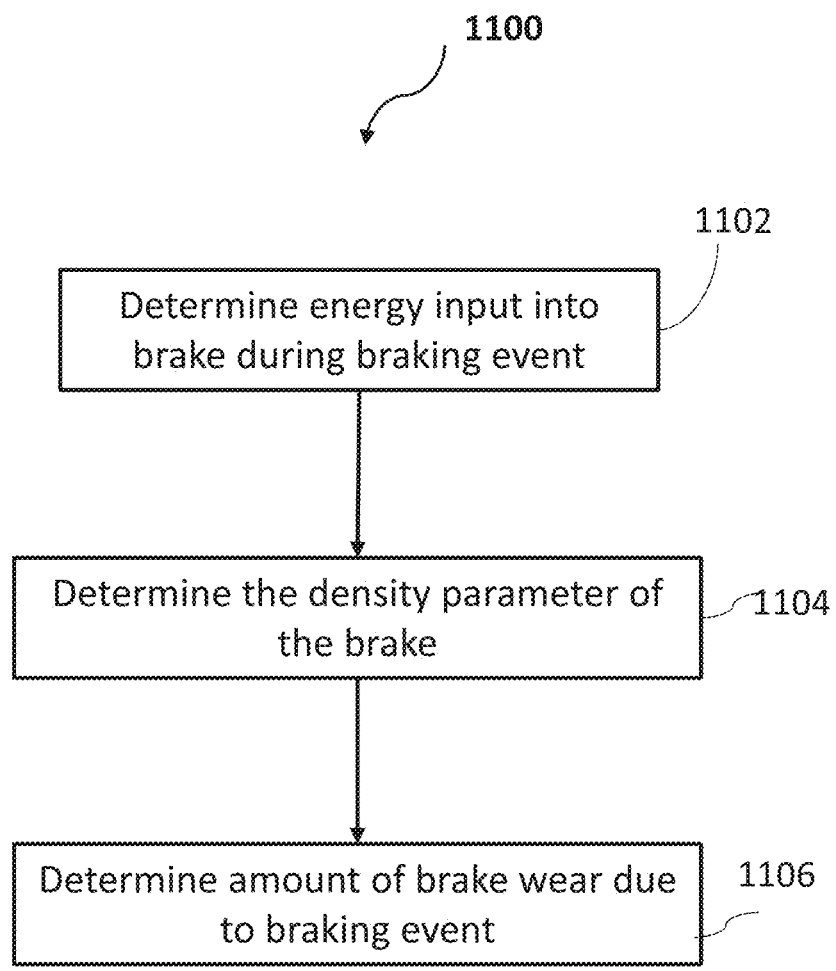
FIG. 11 is an exemplary flow diagram of a method of determining an amount of brake wear according to an example.

FIG. 11 is a flow diagram of a method 1100 of determining an amount of brake wear caused by a braking event, using a brake wear model based on an amount of energy absorbed by the brake assembly 200 due to the braking event and a density parameter of the brake assembly 200. The amount of brake wear may be determined for all braking events where energy is input into the brake assembly 200 in a process involving friction that would cause a surface of the brake discs to wear. For example, wear of the brake discs due to friction may cause the length of the brake discs 202 (length L as shown in FIG. 2) to decrease as brake disk material is lost by the action of friction.

For example, the amount of brake wear may be determined for those braking events which do not involve any high temperature events. For the method 1100, a braking event may, for example, be identified based on the temperature profile as an event where the temperature of the brake assembly 200 increases. In some examples, a braking event may simply be identified based on an indication that brake assembly 200 has been applied. For example, the computing system 106 of the aircraft 100 may detect when brake assembly 200 is applied and released.

At block 1102 of the method 1100, the energy input into the brake assembly 200 during the braking event is determined. The energy input into the brake assembly 200 may, for example, be determined based on the characteristics of the aircraft 100 during the braking event, such as a mass of the aircraft 100, the velocity of the aircraft 100 during the braking event, etc. The energy absorbed by the brake assembly 200 can be calculated based on such characteristics of the aircraft 100 by determining the kinetic energy of the aircraft 100. For example, a given proportion of the kinetic energy of the aircraft 100 may be absorbed by the brake assembly 200 to reduce the kinetic energy of the aircraft 100. In some examples, the energy input into the brake assembly 200 may be determined based on measurements acquired by the instruments 108 of the aircraft 100. For example, the instruments 108 may include a tachometer associated with the wheel 104 to which the brake assembly 200 is associated. In such examples, the tachometer measures the rotational speed of the wheel 104, and the energy absorbed by the brake assembly 200 can be determined using the change of the rotational speed with respect to time.

In other examples, if the mass of the brake assembly 200 is known, the energy absorbed may be determined based on the increase in temperature of the brake assembly 200 taking into account the specific heat of the brake assembly 200. In some examples, the mass of the brake assembly 200 may be determined based on the thermal oxidation state of the brake assembly 200 determined according to the above described methods, because, as described above, the thermal oxidation state may be expressed as an amount of mass lost from brake assembly 200 due to thermal oxidation.

At block 1104 of the method 1100, a density parameter of the brake assembly 200 is determined. The density parameter, for example, is a parameter indicating the decrease in density of the brake assembly 200 compared with the original density, taking into account lost mass. The density of the brake assembly 200 may decrease, for example, due to thermal oxidation. It will be understood that thermal oxidation causes a reduction in mass because carbon atoms react with oxygen to form carbon dioxide or carbon monoxide and are thus removed from brake discs 202. However, thermal oxidation may not necessarily change the volume of the brake discs 202. This is because thermal oxidation may not act uniformly on a particular surface of a brake disc and may take place up to a certain depth inside the brake disc.

The density parameter may be expressed as (1-Ox) where the thermal oxidation state Ox is expressed as a number between zero and one. For example, the density of the brake assembly 200 is reduced by a factor (1-Ox) compared to the initial density before any thermal oxidation took place (i.e. when the brake assembly 200 was new). Therefore, the density parameter may be determined based on the initial oxidation state before the braking event.

In some examples, the reduced density of the brake assembly 200 may be determined based on measurements by instruments included in the instruments 108. For example, the mass of the brake assembly 200 may be calculated based on an amount of energy absorbed by the brake assembly 200 (based on measurements from a tachometer, for example) and the consequent increase in its temperature (based on measurements from temperature sensor 218, for example). The reduced density of the brake assembly 200 may be determined based on the calculated mass of the brake assembly 200. The aircraft 100 may include the described wear pin associated with brake assembly 200. Typically, a wear pin provides an indication of the reduction in length L of a brake and therefore an indication of the brake wear. The wear pin may be checked between cycles by ground crew, for example, and an updated volume value of the brake assembly 200 acquired. In some examples, there may be other ways to measure the change in length L of the brake assembly 200. For example, a length sensor may be provided for the brake assembly 200, and/or electrically actuated brakes may be used. An updated volume value may be determined, based on reduced length L, and used to determine the reduced density from the mass. During a single cycle, the change in volume of brake assembly 200 may be insignificant for the purpose of calculating the density parameter, and an updated volume may be acquired after a number of cycles. From the reduced density, the density parameter may be determined.

At block 1106 of the method 1100, an amount of brake wear caused by the braking event is determined, using a brake wear model based on the energy absorbed by the brake assembly 200 and the density parameter from block 1104. For example, the mass of the brake assembly 200 lost due to wear during the wear event is determined using the brake wear model of Equation 5 below.

$$m_{wear} = \frac{W + X \times E_{brake} + Y \times E_{brake}^2 + Z \times E_{brake}^3}{(1 - Ox)} \quad (5)$$

In Equation 5 above, $m_{wear}$ is the mass lost due to wear during the braking event, $E_{brake}$ is the energy absorbed by the brake assembly 200, and W, X, Y and Z are constants. The constants W, X, Y and Z may, for example, be determined by experiment beforehand, and may vary depending on the properties of the brake assembly 200. The brake wear amount for a braking event may be determined as a reduction in length L of the brake assembly 200 based on the reduction of mass due to brake wear during that braking event.

As mentioned above, the initial thermal oxidation rate is used to determine the density parameter in some examples. In these examples, when a braking event takes place during which a high temperature event also occurs, the initial thermal oxidation state may be used for the determination of block 1106. This is because brake wear occurs on a much shorter timescale than thermal oxidation.

The amount of brake wear determined for a braking event may be added to the amount of brake wear from all previous braking events of the brake assembly 200 in order to determine the total brake wear amount.

The method 1100 may, for example, be performed live during a time when braking events are taking place, or for a use cycle which has already occurred using the relevant data from that use cycle. The method 1100 may also be used in order to predict a future brake wear amount for the brake assembly 200 after a second plurality of predicted future use cycles of the aircraft 100. The second plurality of predicted future use cycles may be a number of cycles after which a brake wear threshold is reached. Each predicted future use cycle may include a respective plurality of braking events. For example, the method 1100 may be performed for each braking event in the second plurality of predicted future use cycles. The wear amount from each of those braking events may be added up to predict the future brake wear amount for the second plurality of predicted future use cycles. For each predicted future use cycle, the predictions may be based on predicted amounts of energy absorbed by the brake during respective braking events, and respective predicted density parameters of the brake for respective braking events. For example, braking events may be identified and energy absorbed by brake assembly 200 for those braking events determined based on the predicted temperature profiles. In other examples, predicted amounts of absorbed energy may be based on data from previous cycles. If the brake assembly 200 is new, or enough previous data is not available, the predicted amounts of energy may be predetermined.

For the purpose of predicting the future brake wear amount, the method 1100 may be used in combination with the method 700 or 800. In these examples, the up to date initial thermal oxidation state just before each predicted braking event (e.g. a predicted future braking event) is known. In this way, the mass of the brake assembly 200, and therefore the density parameter, may be determined using the initial thermal oxidation before the future braking event in question.

As mentioned above, the second plurality of predicted future use cycles may be a number of predicted future cycles after which the predicted future brake wear amount reaches a brake wear threshold. For example, the prediction of the future brake wear amount may stop after a cycle in which the brake wear threshold is reached. In some examples, the prediction of the future brake wear amount may stop as soon as the total brake wear amount reaches the brake wear threshold. The brake wear threshold may be a total amount of brake wear at which servicing or replacement of the brake assembly 200 or a component of the brake assembly 200 is required. For example, a brake assembly such as the brake assembly 200 of FIG. 2 may require a service if its length L has been reduced by, say, 22% to 24%, depending, for example, on the kind of discs and original, manufactured density thereof. For an exemplary disk having an original length L of around 221 mm, a reduction in length of around 60-64 mm may trigger servicing or replacement. In this example, the second plurality of predicted future use cycles is the number of cycles it takes for the total brake wear amount to reach or exceed, for instance 60-64 mm (again, for an original disc having a length L of around 221 mm).

On the other hand, in some examples, the prediction of the future brake wear amount may stop at the end of a predicted future use cycle during which the total brake wear amount approaches close to the brake wear threshold such that the total brake wear amount can be expected to reach the brake wear threshold during the next predicted future use cycle. In such examples, the brake wear threshold may be considered reached within the second plurality of predicted future use cycles. This is because, in reality, an aircraft 100 with the brake assembly 200 expected to reach the brake wear threshold in a strict sense in the very next cycle would not be permitted to fly and a service or replacement relating to the brake assembly 200 may take place at that point.

Using the second plurality of predicted future use cycles, an indication may be given as to how many use cycles can take place before the brake assembly 200 or a component of the brake assembly 200 requires servicing or replacement due to brake wear. In the examples where the brake wear threshold is strictly reached or exceeded during the last of the second plurality of future cycles, the number of cycles before a service or replacement is required due to brake wear may be predicted as one less than the number of cycles in the second plurality. In examples where the prediction of the future brake wear amount stops when the brake wear threshold is expected to be reached in the next cycle after the second plurality, the second plurality is taken as the number of cycles before a service or replacement due to brake wear is required.

Figure 12:
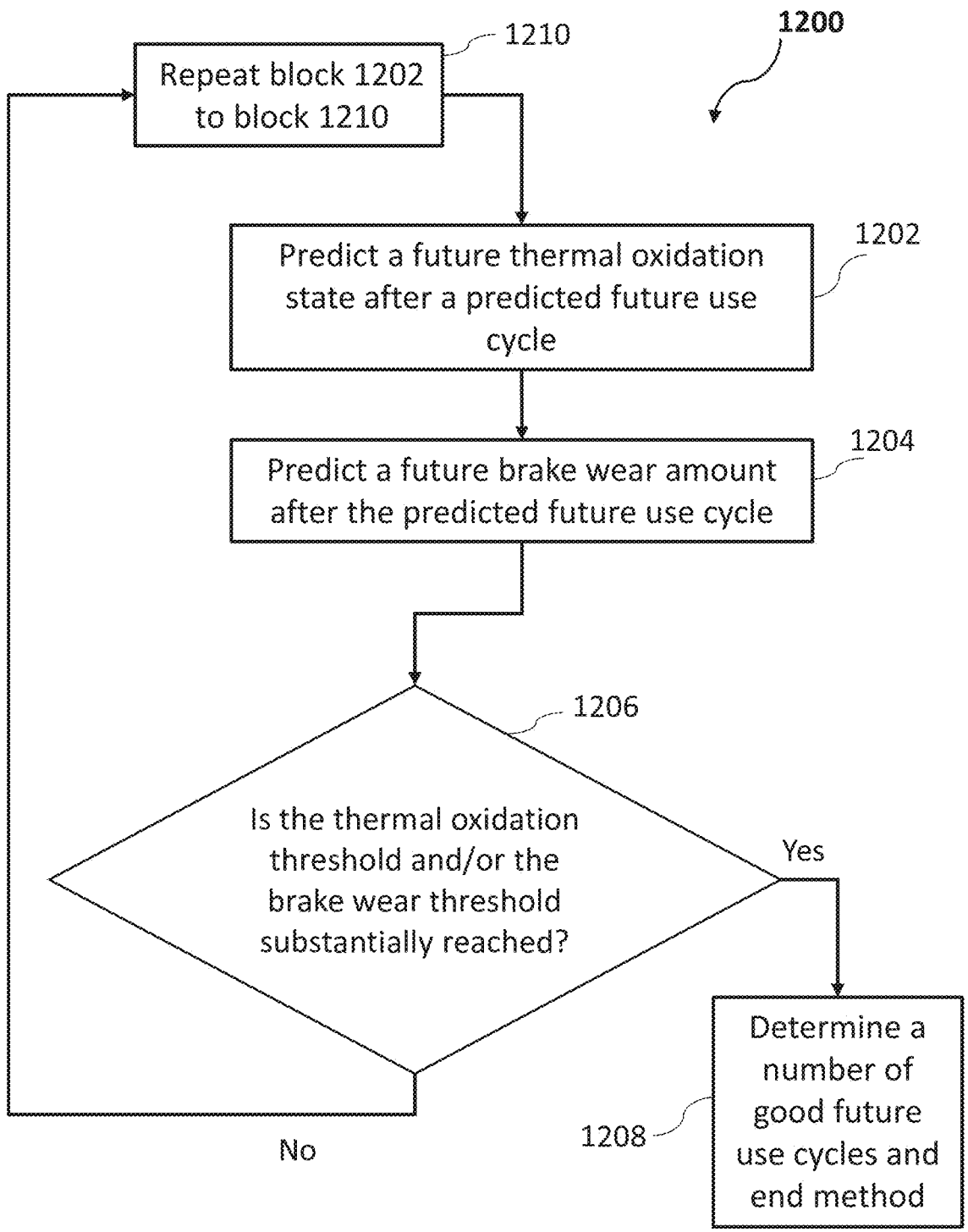
FIG. 12 is an exemplary flow diagram of a method of predicting a number of good future use cycles with respect to an aircraft brake according to an example.

FIG. 12 is a flow diagram of a method 1200 for determining a number of good future use cycles until one of the thermal oxidation threshold and the brake wear threshold is reached. The number of good future use cycles is the remaining number of future use cycles before one of the thermal oxidation threshold or the brake wear threshold is reached. The method 1200 may be performed for a number of predicted future use cycles until the first of the thresholds is reached. The method 1200 involves predicting a future thermal oxidation state and a future brake wear amount after a predicted future use cycle and, if one of the thermal oxidation threshold and the brake wear threshold is reached, determining a number of good future use cycles before either of the thresholds is reached. If one of the thresholds is not reached, the predictions are performed for the next predicted future use cycle. As in the above examples, each predicted future use cycle includes a plurality of braking event. For each predicted future use cycle the predictions are based on a respective predicted temperature profile of the brake, a current thermal oxidation state, predicted amounts of energy absorbed by the brake during respective braking events, and respective predicted density parameters of the brake for respective braking events.

The number of good future use cycles is a number of cycles after which servicing or replacement of the brake assembly 200 or a component of the brake assembly 200 may be required. It will be appreciated that service or replacement in relation to the brake assembly 200 may be carried out when one of the thermal oxidation threshold or the brake wear threshold is first reached. Which threshold is reached first may, for example, depend on the way the aircraft 100 is handled during use and its flight schedule. For example, if the aircraft 100's schedule involves flying to mostly airports with long runways, short taxiing routes, etc., the brake wear threshold may be reached first. This is because, in such examples, the temperature of the brake assembly 200 may not often exceed any of the temperature thresholds relating to thermal oxidation. On the other hand, the aircraft 100 may often experience high energy braking (e.g. due to short runways) causing temperatures above the thresholds related to thermal oxidation. In such examples the thermal oxidation threshold may be reached first.

However, as described above, is some examples, it may be determined whether the brake 200 is capable of performing the future rejected take-off event. The brake 200 may be considered safe for use if it is determined that it is capable of performing the future rejected take-off event irrespective of whatever threshold is reached. However, in some examples, if the predicted future oxidation state is too advanced such that use of the brake 200 is not desirable, the brake 200 may not be deemed safe for use.

At block 1202 of the method 1200, a future thermal oxidation state after a predicted future use cycle is predicted. The prediction of the future thermal oxidation state is performed as described above, for example, using an appropriate thermal oxidation model based on a predicted temperature profile of the predicted future use cycle in question. At block 1204 of the method 1200, a future brake wear amount after the same predicted future use cycle is predicted. The prediction is performed as described above in the context of method 1100.

At block 1206 of the method 1200, it is determined whether the thermal oxidation threshold and/or the brake wear threshold is reached. For example, if the thermal oxidation threshold is reached, the method 1200 proceeds to block 1208 at which a number of good future use cycles, before either of the thermal oxidation threshold or the brake wear threshold is reached, is determined, and the method 1200 ends. For example, if the thermal oxidation threshold is strictly reached or exceeded after a given number of predicted future use cycles, the number of good future use cycles is one less than that given number. For example, if the thermal oxidation threshold is expected to be reached in the very next predicted future use cycle, the number of good future use cycles is determined as the number of predicted future use cycles for which the method 1200 has been performed thus far.

On the other hand, if it is determined that the brake wear threshold is reached, the method proceeds to block 1208 where a number of good future use cycles is determined, and the method 1200 ends. For example, if the brake wear threshold is strictly reached or exceeded after a given number of predicted future use cycles, the number of good future use cycles is one less than that given number. For example, if the brake wear threshold is expected to be reached in the very next predicted future use cycle, the number of good future use cycles is determined as the number of predicted future use cycles for which method 1200 has been performed thus far.

If, for example, both the thresholds are reached, the method 1200 proceeds to block 1208 where a number of remaining good future use cycles, before either the thermal oxidation threshold or the brake wear threshold is reached, is determined and the method 1200 ends. In this example, if at least one of the thresholds is strictly reached or exceeded after a given number of predicted future use cycles, the number of good future use cycles is one less than that given number. Otherwise, the number of good future use cycles is determined as the number of predicted future use cycles for which the method 1200 has been performed thus far.

If the brake wear threshold is not reached, the method 1200 proceeds to block 1210 and blocks 1202 to 1210 are repeated for the next predicted future use cycle.

In this way, a number of good future use cycles may be predicted based on which of the thermal oxidation threshold and the brake wear threshold is reached first. This is because, the brake assembly 200 may require a service or replacement, or a component of the brake assembly 200 may require a service or replacement once the first of these thresholds is reached. It will be appreciated, for example, that brake assembly 200 will not continue to be used if the thermal oxidation threshold is reached but the brake wear threshold is not. It should also be appreciated that blocks of the method 1200 may be performed in any suitable order. For example block 1204 may be performed before block 1202 and/or block 1210 may be performed before block 1206.

One or more of the above described methods, namely the methods 700, 800, 1100 and 1200, or any of their variations (e.g. live determination of oxidation or brake wear, or prediction of future thermal oxidation state or future brake wear, etc.) may be performed by a processor of the computing system 106 of the aircraft 100, for example, based on instructions stored in a computer readable storage medium of the computing system 106. For example, monitoring of the thermal oxidation state (subsequent to use cycles or live) may be performed by a processor of computing system 106. Alternatively, or in addition, monitoring of the brake wear (subsequent to use cycles or live) may be performed by a processor of the computing system. Alternatively, or in addition to any of these examples, predictions relating to the future thermal oxidation state and/or the future brake wear state may be performed by a processor of the computing system 106. The methods may be performed, for example, using data from the instruments 108. For example, temperature data as measured by the temperature sensor 218 may be used. In the case of prediction, the future temperature profiles and/or other predicted data may be predicted by a processor of the computing system 106. Alternatively, the data for prediction may be determined on a computing system not on board the aircraft 100, and may be stored in a computer readable storage medium of the computing system 106.

All or part of the instructions for performing the above described methods may be generated and/or the methods may be performed using any suitable software or combination of software. In one example, "MATLAB" may be used to generate all or part of the instructions for a processor such as processor 502 or a processor of computing system 104 to carry out any of the above methods. In other examples, other software packages may be used. For example, any suitable programming language, development environment, software package, or the like may be used. Other examples of programming languages include PYTHON, C++, C, JAVASCRIPT, FORTRAN etc.

It is to be noted that the term "or" as used herein is to be interpreted to mean "and/or", unless expressly stated otherwise. It will appreciated that the temperature characteristic determined according to the above methods may be an expected temperature characteristic which is expected according to the model(s) applied in order to determine the relationship information.

The invention claimed is:

1. A non-transitory computer readable storage medium having stored thereon instructions which, when executed by a processor, cause the processor to:
   determine whether an aircraft wheel brake is capable of performing a future rejected take-off event, comprising:
      determining from a rejected take-off energy parameter and a set of brake parameters whether a predicted mass of the brake is sufficient to perform the future rejected take-off event.

2. The non-transitory computer readable storage medium according to claim 1, wherein the instructions, when executed by the processor, cause the processor to:

determine a number of predicted future use cycles after which the predicted mass is expected to be insufficient to perform the future rejected take-off event.

3. The non-transitory computer readable storage medium according to claim 1, wherein the instructions, when executed by the processor, cause the processor to:
determine a mass limit defining the minimum mass required to perform the future rejected take-off event.

4. The non-transitory computer readable storage medium according to claim 3, wherein the instructions, when executed by the processor, cause the processor to:
determine whether the predicted mass is sufficient to perform the future rejected take-off event by comparing the predicted mass to the mass limit.

5. The non-transitory computer readable storage medium according to claim 3, wherein the instructions, when executed by the processor, cause the processor to:
determine the mass limit using an amount of energy to be absorbed by the brake when performing the future rejected take-off event determined based on characteristics of the brake.

6. The non-transitory computer readable storage medium according to claim 3, wherein the instructions, when executed by the processor, cause the processor to:
determine a number of predicted future use cycles for the predicted mass to reduce to the mass limit.

7. The non-transitory computer readable storage medium according to claim 1, wherein the instructions, when executed by the processor, cause the processor to:
issue a first notification, if the predicted mass is determined to be sufficient to perform the future rejected take-off event.

8. The non-transitory computer readable storage medium according to claim 1, wherein the instructions, when executed by the processor, cause the processor to:
repeat the determination of whether the brake is capable of performing the future rejected take-off event, if the predicted mass is determined to be insufficient to perform the future rejected take-off event.

9. The non-transitory computer readable storage medium according to claim 8, wherein:
the determination is repeated using an updated rejected take-off energy parameter determined based on an updated aircraft weight.

10. The non-transitory computer readable storage according to claim 9, wherein the instructions, when executed by the processor, cause the processor to:
responsive to the updated aircraft weight satisfying an aircraft weight criterion, issue a second notification indicating that the brake requires a service or replacement, and cease repeating the determination.

11. The non-transitory computer readable storage medium according to claim 1, wherein the instructions, when executed by the processor, cause the processor to:
determine the rejected take-off energy parameter based on a set of user input parameters.

12. The non-transitory computer readable storage medium according to claim 1, wherein:
the set of brake parameters comprises an upper temperature cut-off for the brake.

13. The non-transitory computer readable storage according to claim 1, wherein the instructions, when executed by the processor, cause the processor to:
determine a temperature limit which is the maximum temperature the brake is expected to reach upon the future rejected take-off event taking place.

14. The non-transitory computer readable storage medium according to claim 13, wherein the instructions, when executed by the processor, cause the processor to:
determine whether the predicted mass of the brake is sufficient to perform the future rejected take-off event by comparing the temperature limit to an upper temperature cut-off for the brake.

15. A method comprising:
determining whether an aircraft wheel brake is capable of performing a future rejected take-off event, comprising:
determining from a rejected take-off energy parameter and a set of brake parameters whether a predicted mass of the brake is sufficient to perform the future rejected take-off event.

16. The method according to claim 15 comprising:
determining a number of predicted future use cycles after which the predicted mass is expected to be insufficient to perform the future rejected take-off event.

17. An apparatus comprising a processor configured to:
determine whether an aircraft wheel brake is capable of performing a future rejected take-off event, comprising:
determining from a rejected take-off energy parameter and a set of brake parameters whether a predicted mass of the brake is sufficient to perform the future rejected take-off event.

* * * * *